US012771068B2

(12) United States Patent
Sung et al.

(10) Patent No.: US 12,771,068 B2
(45) Date of Patent: Oct. 20, 2026

(54) CONNECTOR

(71) Applicant: BELLWETHER ELECTRONIC CORP., Taoyuan City (TW)

(72) Inventors: Tai-Ching Sung, Taoyuan City (TW); Yung-Liang Chi, Taoyuan City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 344 days.

(21) Appl. No.: 18/621,257

(22) Filed: Mar. 29, 2024

(65) Prior Publication Data

US 2025/0070509 A1 Feb. 27, 2025

Related U.S. Application Data

(60) Provisional application No. 63/534,858, filed on Aug. 27, 2023.

(30) Foreign Application Priority Data

Jan. 31, 2024 (TW) ................................ 113103653

(51) Int. Cl.
*H01R 13/635* (2006.01)
*H01R 13/627* (2006.01)

(52) U.S. Cl.
CPC ....... *H01R 13/635* (2013.01); *H01R 13/6275* (2013.01)

(58) Field of Classification Search
None
See application file for complete search history.

(56) References Cited

U.S. PATENT DOCUMENTS 9,761,998 B2 * 9/2017 De Dios Martin .......................... H01R 13/6335
11,417,988 B1 * 8/2022 Chang ................ H01R 13/6271
11,664,623 B2 * 5/2023 Yu ...................... H01R 13/6275 439/352
2023/0155315 A1 * 5/2023 Chang ................ H01R 13/6335 439/85

* cited by examiner

*Primary Examiner* — Tho D Ta
(74) *Attorney, Agent, or Firm* — Li & Cai Intellectual Property (USA) Office

(57) ABSTRACT

A connector is provided. The connector is configured to mate with a docking connector. The connector includes an insulating base, a lock structure, an elastic arm, and a drawstring. One end of the insulating base has a docking interface. The lock structure is disposed on one side of the insulating base. The lock structure is configured to engage with a docking lock structure of the docking connector. The elastic arm is disposed on the insulating base, and one end of the elastic arm is arranged at one side of one end of the lock structure. One end of the drawstring and the elastic arm are connected to each other, and another end of the drawstring is exposed from another end of the insulating base. The elastic arm is moved by the drawstring so as to press the end of the lock structure.

13 Claims, 24 Drawing Sheets

CONNECTOR

CROSS-REFERENCE TO RELATED PATENT APPLICATION

This application claims the benefit of priority to Taiwan Patent Application No. 113103653, filed on Jan. 31, 2024. The entire content of the above identified application is incorporated herein by reference.

This application claims the benefit of priority to the U.S. Provisional Patent Application Ser. No. 63/534,858, filed on Aug. 27, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a connector, and more particularly to a connector having a drawstring.

BACKGROUND OF THE DISCLOSURE

In practice, a conventional cable connector is difficult to be removed when it is mated with a docking connector, especially when a size of the conventional cable connector is relatively small, or when a surrounding space of the conventional cable connector is not enough (e.g., the conventional cable connector applied in a server chassis).

SUMMARY OF THE DISCLOSURE

In response to the above-referenced technical inadequacy, the present disclosure provides a connector for improving on the issues associated with the conventional cable connector and the docking connector that are difficult to be separated from each other after being mated with each other, especially when a size of the conventional cable connector is relatively small, or when a surrounding space of the conventional cable connector is not enough.

In order to solve the above-mentioned problems, one of the technical aspects adopted by the present disclosure is to provide a connector configured for mating with a docking connector. The connector includes an insulating base, a lock structure, an elastic arm, and a drawstring. One end of the insulating base has a docking interface. The lock structure is disposed on one side of the insulating base, and the lock structure is configured to engage with a docking lock structure of the docking connector. The elastic arm is disposed on the insulating base. One end of the elastic arm is arranged at one side of one end of the lock structure. One end of the drawstring and the elastic arm are connected to each other, and another end of the drawstring is exposed from another end of the insulating base. When the drawstring is pulled in a direction away from the insulating base, the elastic arm is moved by the drawstring so as to press the end of the lock structure.

In order to solve the above-mentioned problems, another one of the technical aspects adopted by the present disclosure is to provide a connector configured for mating with a docking connector along a docking direction. The connector includes an insulating base, a lock structure, and a drawstring. One end of the insulating base has a docking interface. The lock structure is disposed on one side of the insulating base, and the lock structure is switchable between a locked mode and an unlocked mode by a force so as to be engaged with or separated from a docking lock structure of the docking connector. One end of the drawstring has a noose. The lock structure passes through the noose along a penetrating axis, the lock structure and the noose are connected to each other, another end of the drawstring is exposed from another end of the insulating base, and the penetrating axis is not perpendicular to the docking direction.

In order to solve the above-mentioned problems, yet another one of the technical aspects adopted by the present disclosure is to provide a connector configured for mating with a docking connector along a docking direction. The connector includes an insulating base, a lock structure, an elastic arm, and a drawstring. One end of the insulating base has a docking interface. The lock structure is disposed on a side of the insulating base, and the lock structure is switchable between a locked mode and an unlocked mode by a force so as to be engaged with or separated from a docking lock structure of the docking connector. The elastic arm is disposed on the insulating base. One side of the elastic arm is arranged at a side of an end of the lock structure. One end of the drawstring has a noose, the lock structure passes through the noose along a penetrating axis, the lock structure and the noose are connected to each other, another end of the drawstring is exposed from another end of the insulating base, and the penetrating axis is perpendicular to the docking direction.

Therefore, in the connector provided by the present disclosure, through a design of the lock structure, the elastic arm, and the drawstring, the user can simply pull the drawstring, so that the connector can be directly or indirectly easily, conveniently, and quickly separated from the docking connector. Even if a size of the connector is relative small, or a surrounding space of the connector is not enough, the connector also can be quickly separated from the docking connector by the user pulling the drawstring.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
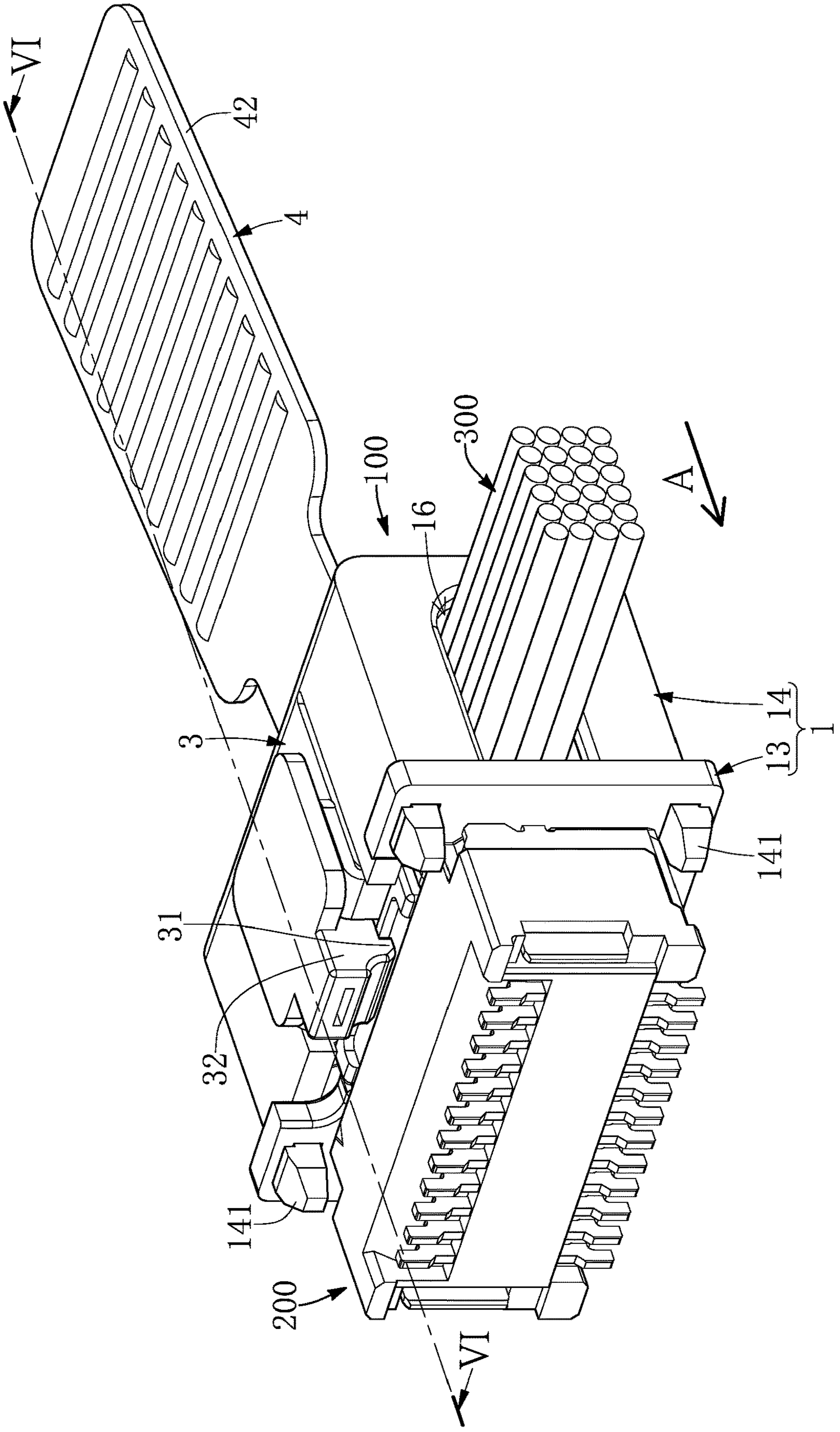
FIG. 1 is a schematic view of a connector and a docking connector mated with each other according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
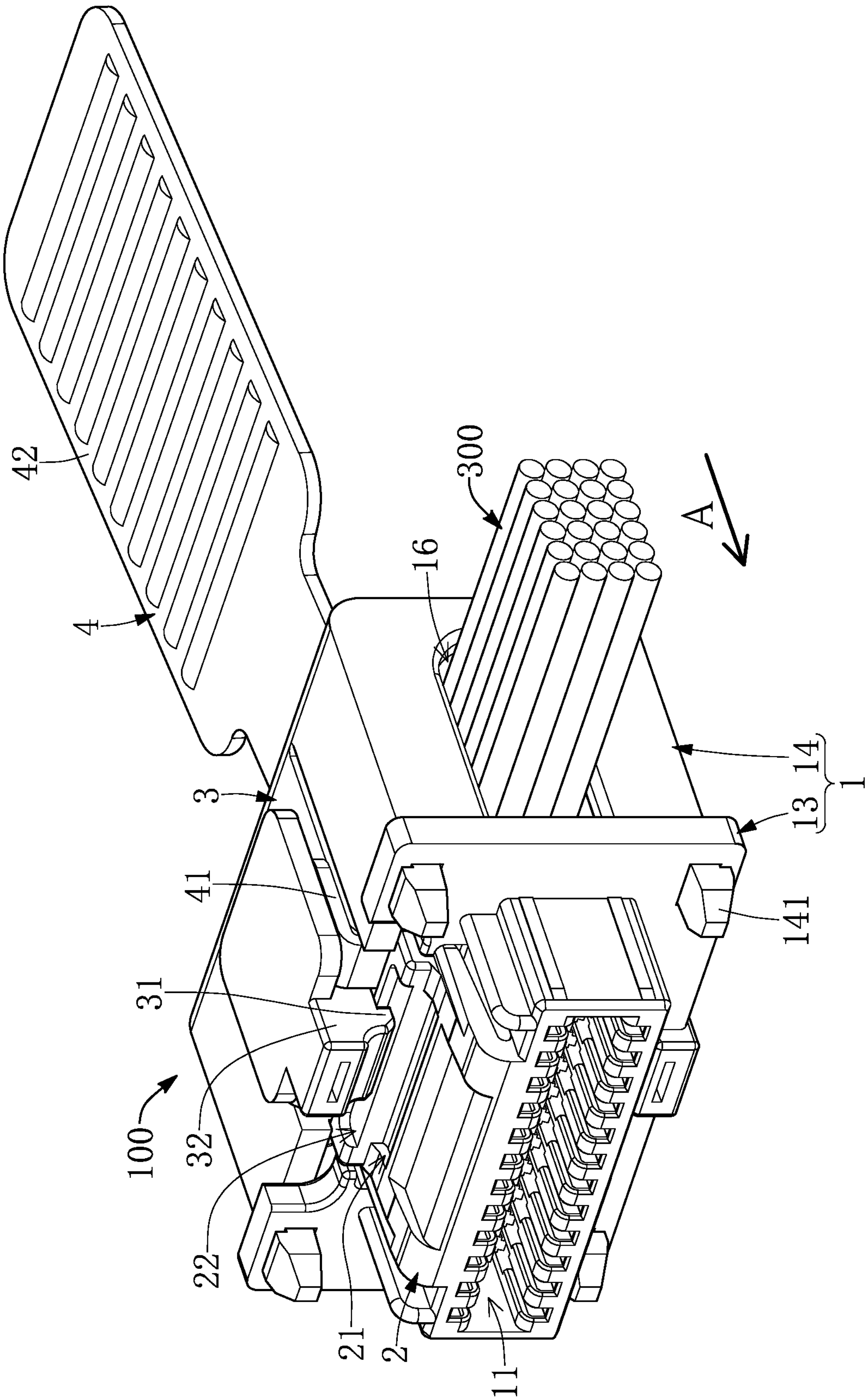
FIG. 2 and FIG. 3 are schematic views of the connector from different angles of view according to the first embodiment of the present disclosure.
Figure 3:
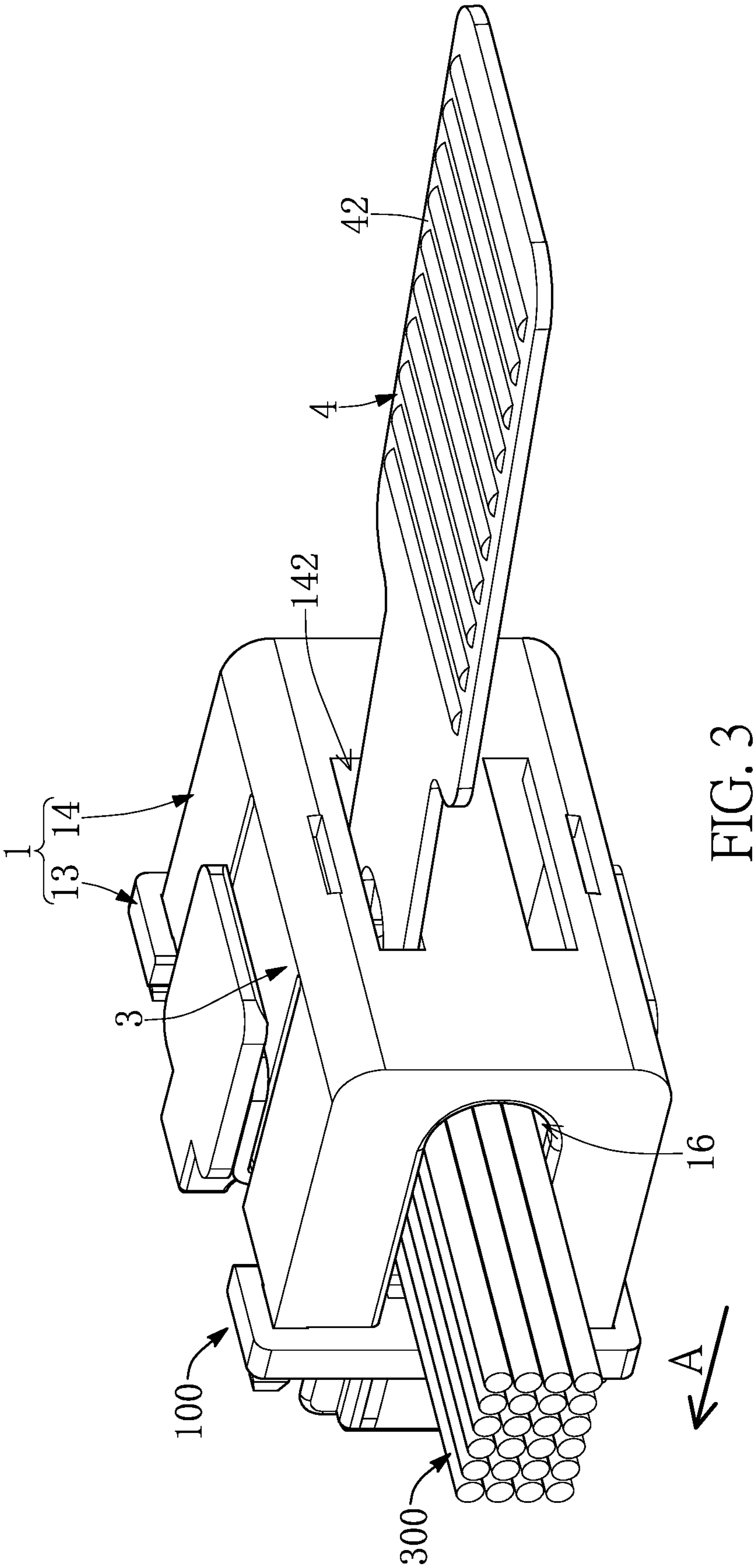
Figure 4:
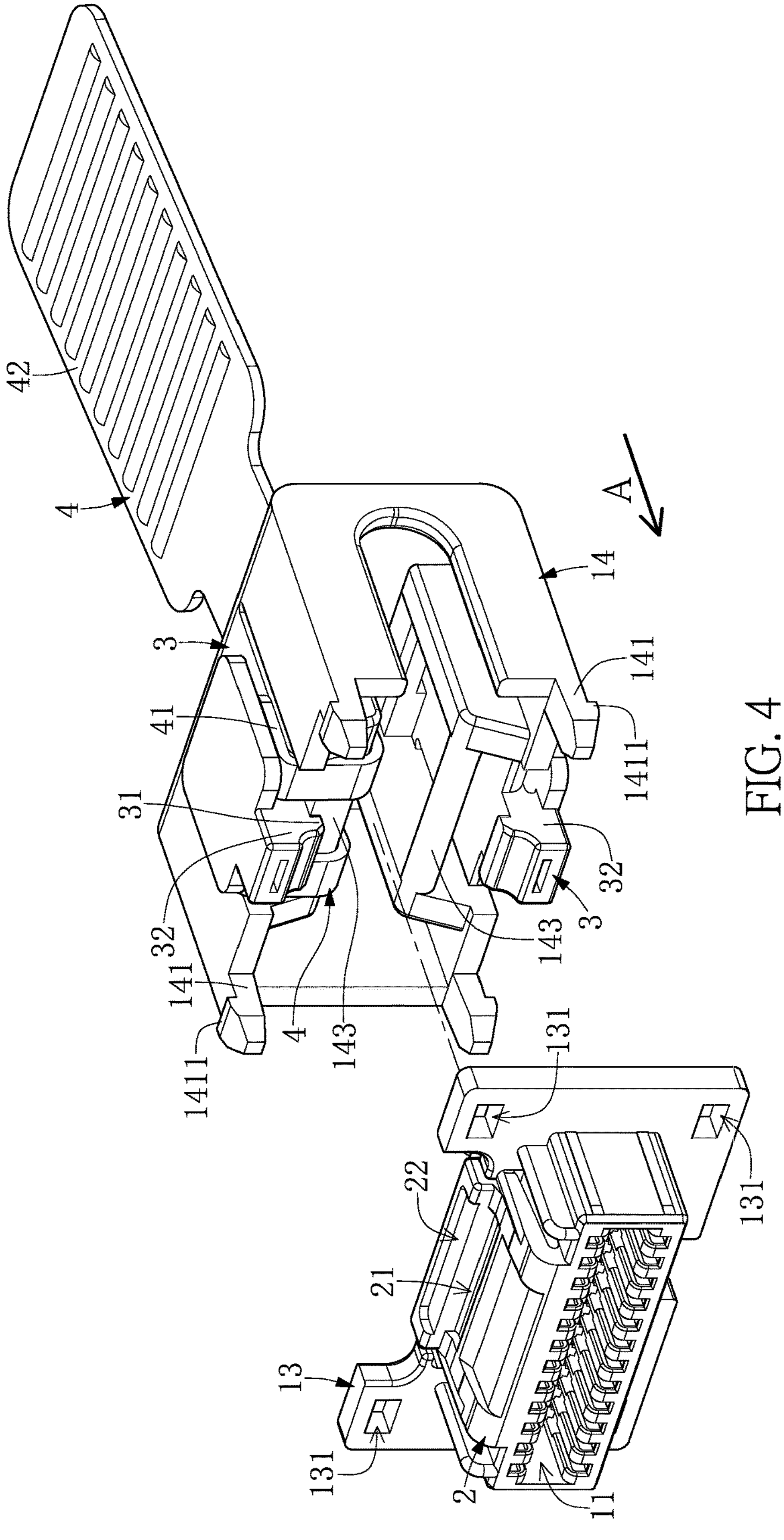
FIG. 4 is a schematic exploded view of an insulating base of the connector according to the first embodiment of the present disclosure.
Figure 5:
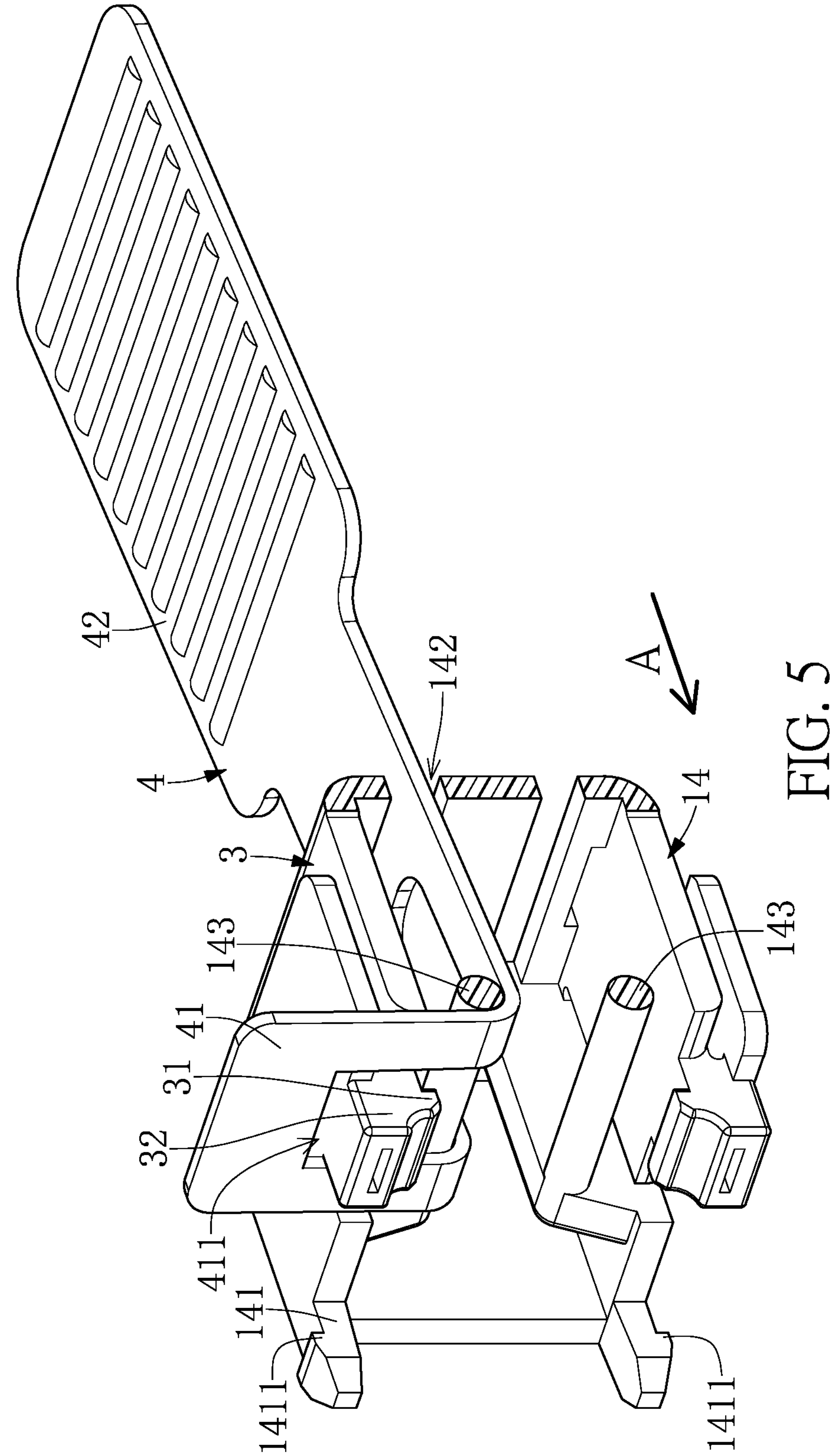
FIG. 5 is a schematic partial sectional view of a cover and a drawstring of the connector according to the first embodiment of the present disclosure.
Figure 6:
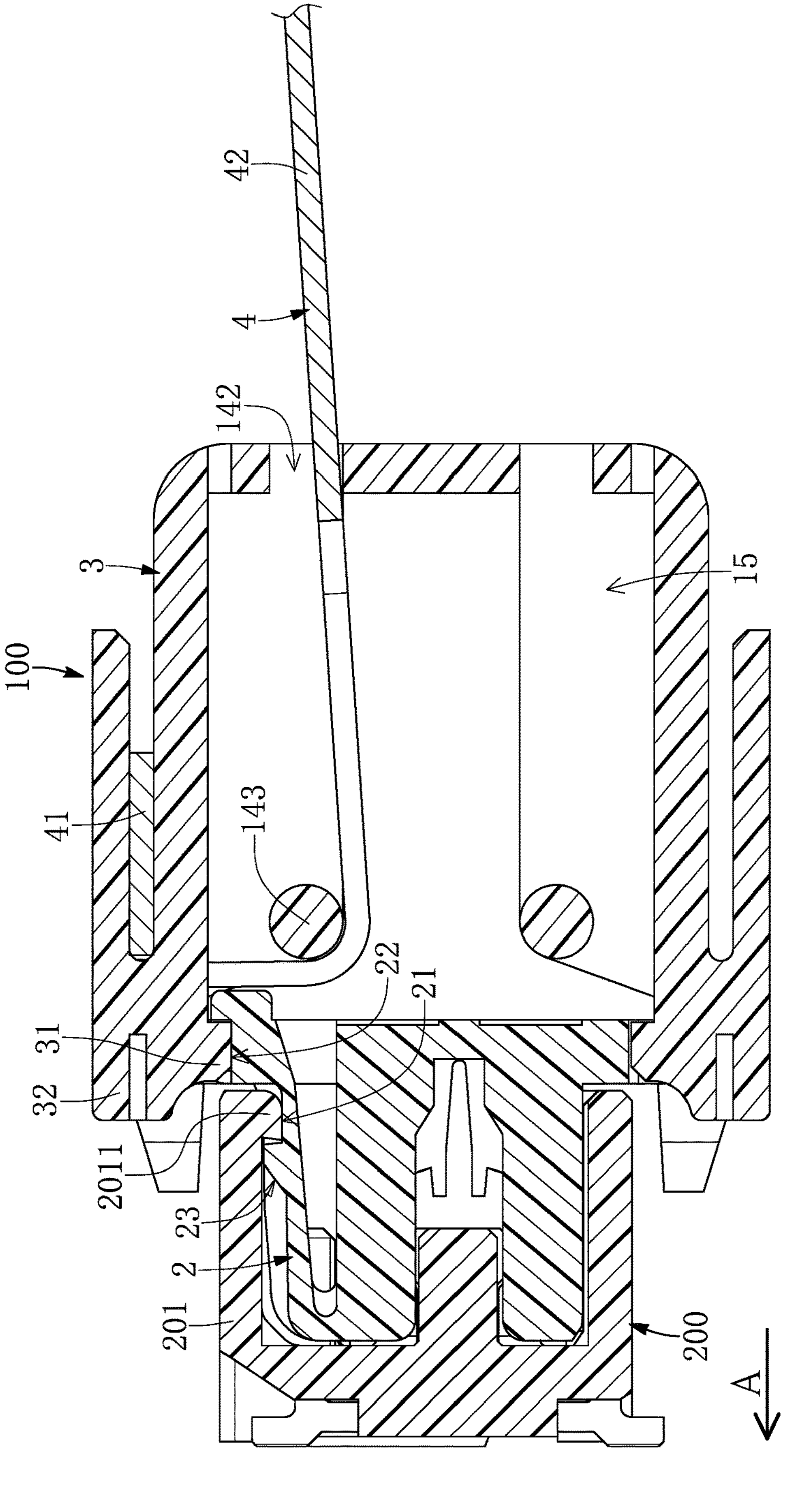
FIG. 6 is a schematic cross-sectional view taken along line VI-VI of FIG. 1.

Referring to FIG. 1 to FIG. 6, FIG. 1 is a schematic view of a connector and a docking connector mated with each other according to a first embodiment of the present disclosure, FIG. 2 and FIG. 3 are schematic views of the connector from different angles of view according to the first embodiment of the present disclosure, FIG. 4 is a schematic exploded view of an insulating base of the connector according to the first embodiment of the present disclosure, FIG. 5 is a schematic partial sectional view of a cover and a drawstring of the connector according to the first embodiment of the present disclosure, and FIG. 6 is a schematic cross-sectional view taken along line VI-VI of FIG. 1.

The present embodiment provides a connector 100, which includes an insulating base 1, a lock structure 2, an unlocking elastic arm 3, and a drawstring 4. The connector 100 is configured to mate with (or insert into) a docking connector 200.

One end of the insulating base 1 has a docking interface. In the present embodiment, the docking interface has an insertion slot 11 provided with at least one conductive component arranged therein. In the present embodiment, a quantity of the at least one conductive component of the insertion slot 11 can be multiple. When the connector 100 and the docking connector 200 are mated (or inserted) with each other along a docking direction A, the conductive components of the insertion slot 11 are respectively mated (or inserted) with a plurality of conductive components of the docking connector 200.

In practice, the insulating base 1 includes a body 13 and a cover 14. One end of the body 13 has the docking interface, and another end of the body 13 is connected to the cover 14. The body 13 and the cover 14 jointly define an accommodating space 15, the conductive components of the insertion slot 11 are connected to a plurality of cables 300, and a part of each of the cables 300 is arranged in the accommodating space 15. At least one side of the cover 14 has an outlet opening 16, and the cables 300 pass through the insulating base 1 through the outlet opening 16. A quantity of the outlet opening 16 and a position of the outlet opening 16 formed on the cover 14 can be designed according to requirements. For example, the outlet opening 16 can be arranged in a left side, a right side, a back side, or a lower side of the cover 14.

The another end of the body 13 and one end of the cover 14 respectively include a plurality of first engaging structures 131 and a plurality of second engaging structures 141, and the body 13 is detachably fixed to the cover 14 through the first engaging structures 131 and the second engaging structures 141. Each of the first engaging structures 131 may be a through hole, and each of the second engaging structures 141 may be an elastic arm structure. After the elastic arm structure passes through the through hole, a protrusion 1411 arranged on a tail end of the elastic arm structure is engaged with a side of the through hole.

The lock structure 2 is arranged at one side of the body 13, and the lock structure 2 can be switched between a locked mode and an unlocked mode by a force so as to be engaged with or separated from a docking lock structure 201 of the docking connector 200. The lock structure 2 can be an elastic sheet-like structure, one end of the elastic sheet-like structure is a fixed end that is connected to the body 13 and another end of the elastic sheet-like structure is a free end. Moreover, a side of the free end of the elastic sheet-like structure has a first engaging portion 21, and the first engaging portion 21 can be a slot (or a protrusion). The free end of the lock structure 2 can further have an engage slot 22, and the first engaging portion 21 is closer to the fixed end of the lock structure 2 than the engage slot 22. In another embodiment, a middle portion of the lock structure 2 may be connected to the body 13 and two ends are free ends, one end having an engaging portion and the other end having an operation portion for be switched between a locked mode and an unlocked mode.

As shown in FIG. 6, when the connector 100 and the docking connector 200 are mated (or inserted) with each other, a second engaging portion 2011 of the docking locking structure 201 of the docking connector 200 is correspondingly engaged with the first engaging portion 21, and the engage slot 22 is exposed from the docking connector 200. The second engaging portion 2011 can be a protrusion (or a slot), so that the second engaging portion 2011 can be correspondingly engaged with the slot (or the protrusion) of the first engaging portion 21.

As shown in FIG. 4 and FIG. 6, one end of the unlocking elastic arm 3 is connected to the insulating base 1, and another end of the unlocking elastic arm 3 is a free end. The unlocking elastic arm 3 can be elastically deformed relative to the insulating base 1 by an external force. The free end of the unlocking elastic arm 3 is arranged adjacent to the free end of the lock structure 2. The free end of the unlocking elastic arm 3 can have an engaging structure 31. When the cover 14 and the body 13 are connected to each other, the engaging structure 31 of the unlocking elastic arm 3 is engaged with the engage slot 22 of the lock structure 2.

As shown in FIG. 4 to FIG. 6, one end of the drawstring 4 has a noose 41, the noose 41 has a through hole 411, the unlocking elastic arm 3 is enclosed by the noose 41, and another end of the drawstring 4 is exposed from the insulating base 1 by passing through a through hole 142 of the cover 14. In practice, an outer side of the unlocking elastic arm 3 can include a fixing structure 32, an inner side of the cover 14 includes a supporting element 143, and the supporting element 143 is arranged adjacent to the free end of the unlocking elastic arm 3. The fixing structure 32 is fixed to the unlocking elastic arm 3, two ends of the supporting element 143 are fixed to the cover 14, and the supporting element 143 is not directly connected to the unlocking elastic arm 3. The fixing structure 32 is wrapped around the noose 41 along a penetrating axis of the noose 41, and the penetrating axis is perpendicular to the docking direction A of the connector 100. In other words, the noose 41 is a ring-shaped structure, and the noose 41 has a through hole penetrating through two surfaces of the drawstring 4. When a structure passes through the ring-shaped structure through the through hole along an axial direction, the axial direction is defined as the penetrating axis.

In an installation manner of the drawstring 4, the fixing structure 32 is wrapped around the noose 41 of the drawstring 4 that is arranged adjacent to an outer side of unlocking elastic arm 3, so that the fixing structure 32 is strapped with the one end of the drawstring 4. Then, the another end of the drawstring 4 is exposed from the cover 14 after being winded around the supporting element 143 and passing through the through hole 142 of the cover 14. In practice, the drawstring 4 can have a hold portion 42 arranged away from one end thereof engaged with the fixing structure 32, and the hold portion 42 has an anti-slip structure (e.g., ribs or a rough surface) or a wider gripping surface to facilitate the user's grip.

It should be noted that, as shown in FIG. 4 of the present embodiment, the cover 14 has two unlocking elastic arms 3 and two supporting elements 143 that are respectively arranged on two opposite sides of the cover 14, so that the user can easily rotate the cover 14 by 180 degrees to be fixed to the body 13, thereby switching a position of the outlet opening 16 and changing an outgoing line direction of the cables 300. In other embodiments, the cover 14 can only include one unlocking elastic arm 3 and one supporting element 143.

As shown in FIG. 6, during the process implemented for mating (or inserting) the connector 100 and the docking connector 200 with each other, the docking locking structure 201 of the docking connector 200 passes a guide inclined plane 23 of the lock structure 2 and engages with the first engaging portion 21. Accordingly, the lock structure 2 is in the locked mode, and the connector 100 can be firmly mated with (or inserted into) the docking connector 200.

Accordingly, as shown in FIG. 6, when the connector 100 and the docking connector 200 are mated with each other, and the drawstring 4 is pulled in a direction away from the insulating base 1, the unlocking elastic arm 3 is moved by the drawstring 4 so as to press the free end of the lock structure 2, thereby separating the first engaging portion 21 of the lock structure 2 from the second engaging portion 2011 of the docking locking structure 201. That is to say, pulling the drawstring 4 makes the lock structure 2 be in the unlocked mode, and then the connector 100 can be separated from the docking connector 200 along with the pulling of the drawstring 4.

In summary, in the present disclosure, through the cooperation of the unlocking elastic arm 3, the drawstring 4, and the lock structure 2, etc. of the connector 100, the user can quickly and simply separate the connector 100, which is fixed to the docking connector 200 through the lock structure 2, from the docking connector 200 by pulling the drawstring 4.

Second Embodiment

Figure 7:
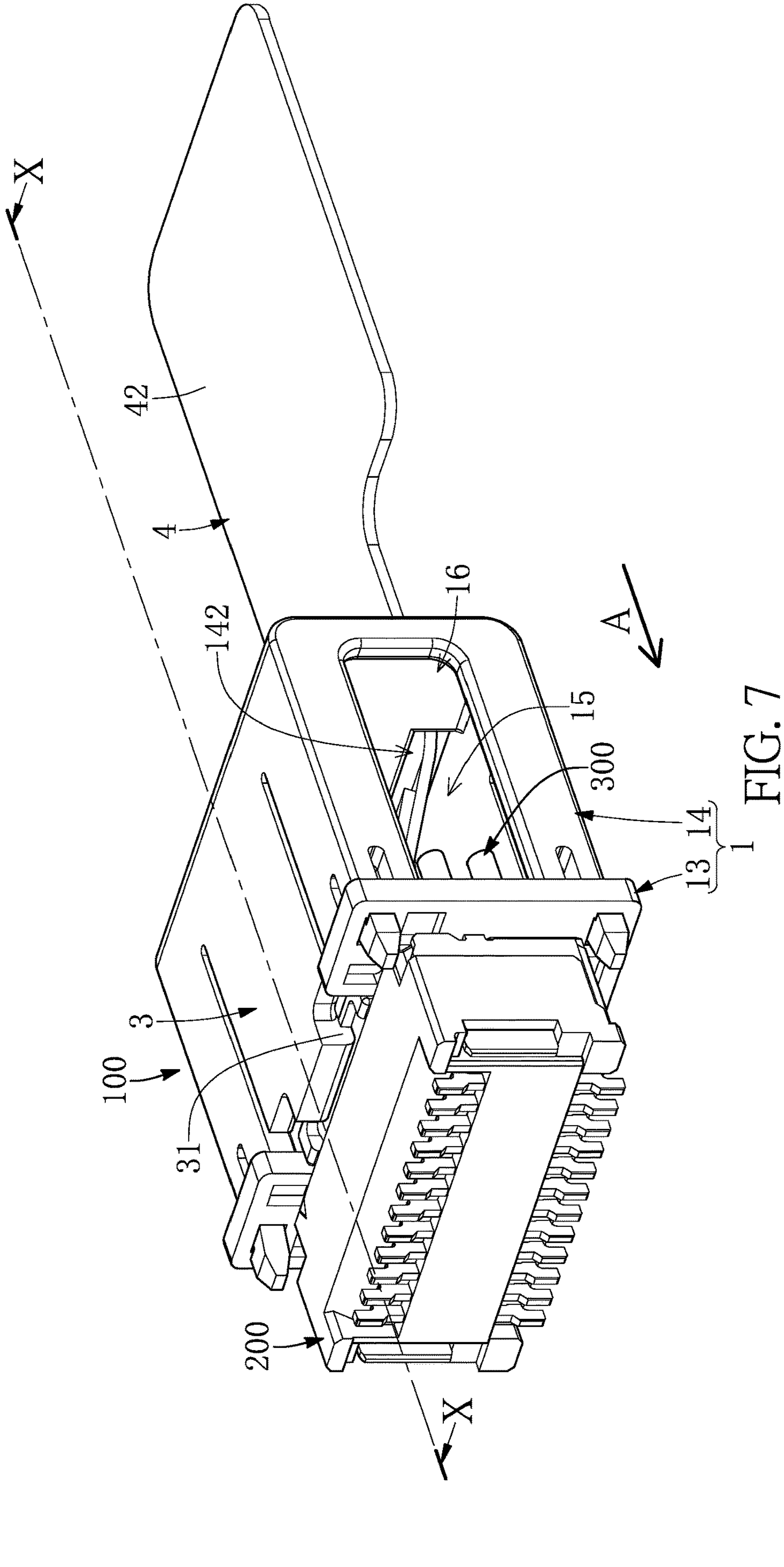
FIG. 7 is a schematic view of a connector and a docking connector mated with each other according to a second embodiment of the present disclosure.
Figure 8:
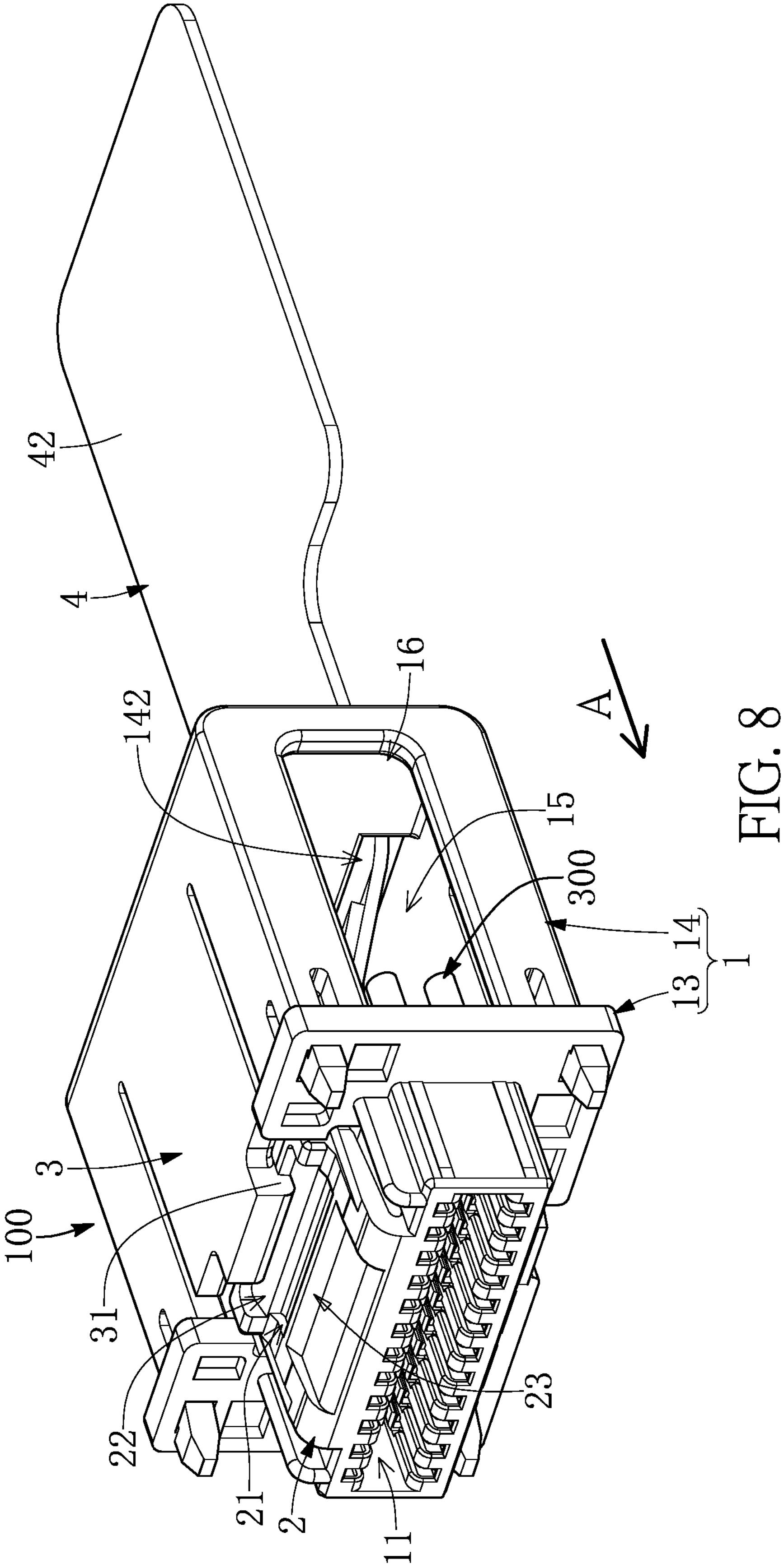
FIG. 8 is a schematic view of the connector according to the second embodiment of the present disclosure.
Figure 9:
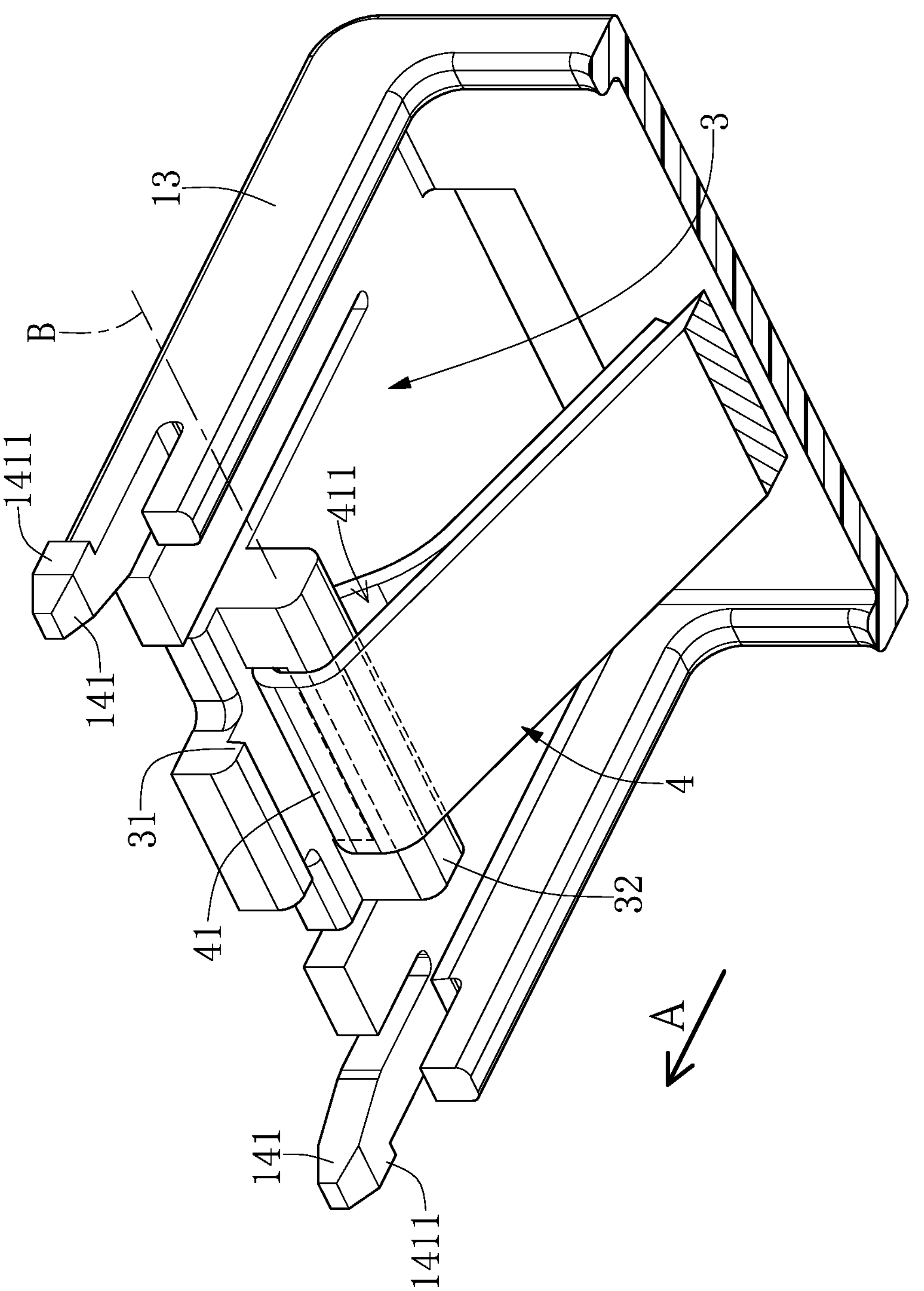
FIG. 9 is a partial sectional view of a cover and a drawstring of the connector according to the second embodiment of the present disclosure.
Figure 10:
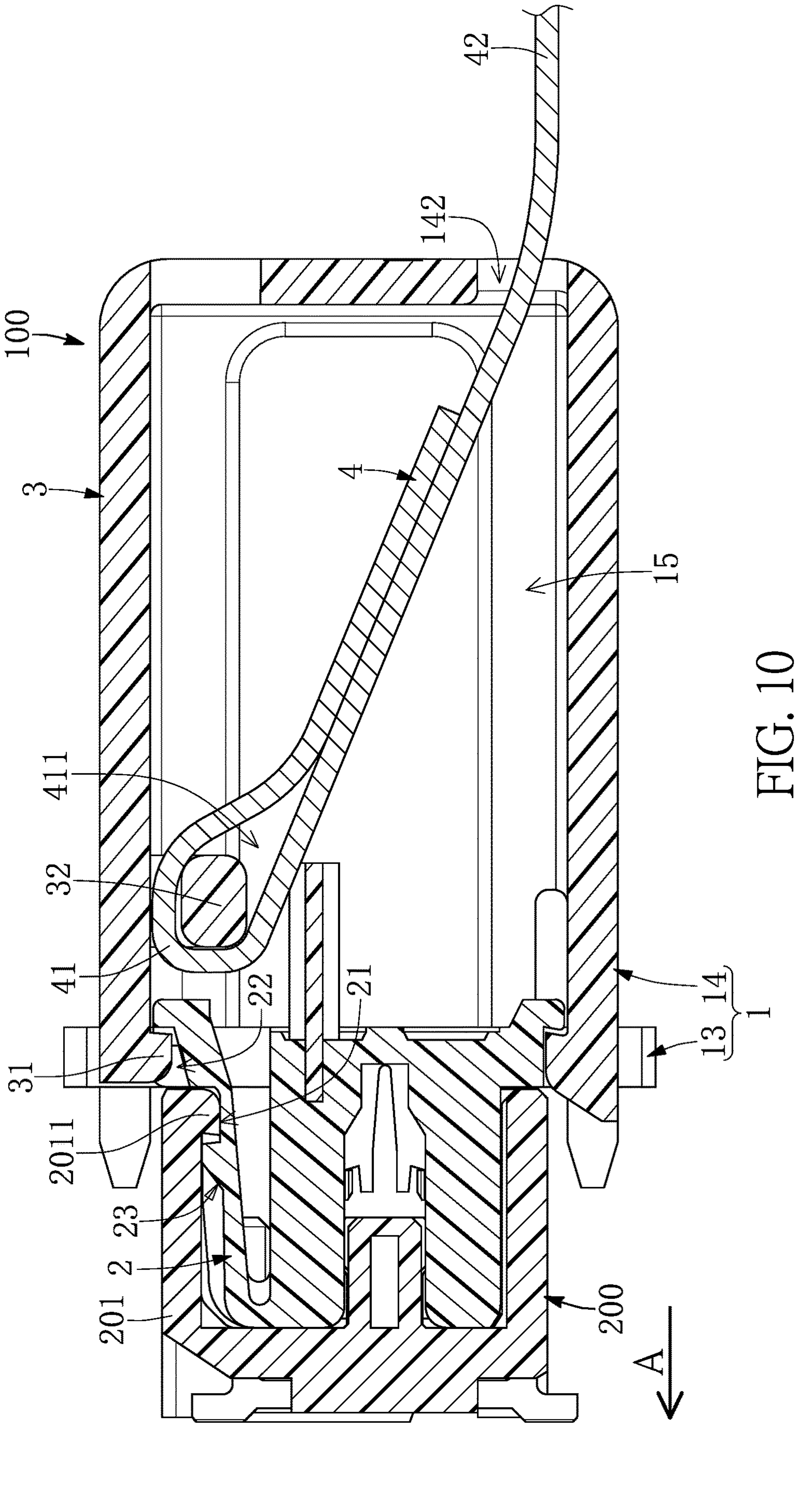
FIG. 10 is a schematic cross-sectional view taken along line X-X of FIG. 7.

Referring to FIG. 7 to FIG. 10, FIG. 7 is a schematic view of a connector and a docking connector mated with each other according to a second embodiment of the present disclosure, FIG. 8 is a schematic view of the connector according to the second embodiment of the present disclosure, FIG. 9 is a schematic partial sectional view of a cover and a drawstring of the connector according to the second embodiment of the present disclosure, and FIG. 10 is a schematic cross-sectional view taken along line X-X of FIG. 7.

A description of the body 13 of the insulating base 1 of the present embodiment is same as the aforementioned description of the body 13 of the first embodiment, and would not be further described herein for the sake of brevity. A difference between the present embodiment and the aforementioned first embodiment is that the fixing structure 32 is disposed on an inner side of the unlocking elastic arm 3, one end of the drawstring 4 has the noose 41, the noose 41 is directly fixed to the fixing structure 32, and another end of the drawstring 4 is exposed from the insulating base 1 by passing through the through hole 142 of the cover 14. The fixing structure 32 is disposed in the noose 41 along a penetrating axis B of the noose 41, and the penetrating axis B is perpendicular to the docking direction A of the connector 100. The unlocking elastic arm 3 is disposed at one side of the cover 14 and an outer surface of the unlocking elastic arm 3 and aside surface of the cover 14 are aligned with each other. The through hole 142 is arranged on another one side of the cover 14, and the through hole 142 is arranged on an area of the insulating base 1 that is away from the fixing structure 32. For example, as shown in FIG. 10, the unlocking elastic arm 3 and the through hole 142 are arranged on two opposite sides or two opposite corners of the cover 14, and the unlocking elastic arm 3 and the through hole 142 are approximately arranged at a front end and a rear end of the cover 14, respectively. In other words, as shown in FIG. 10, the unlocking elastic arm 3 and the through hole 142 are respectively arranged adjacent to two ends along a diagonal line of the cover 14. Naturally, in other embodiments, the unlocking elastic arm 3 and the through hole 142 may be disposed adjacent to the front end and the rear end of one side of the cover 14.

As shown in FIG. 10, when the drawstring 4 is pulled in a direction away from the cover 14, the fixing structure 32 and the unlocking elastic arm 3 are moved by pulling the drawstring 4 so as to press the lock structure 2, thereby enabling the lock structure 2 to be separated from the docking locking structure 201 of the docking connector 200.

Third Embodiment

Figure 11:
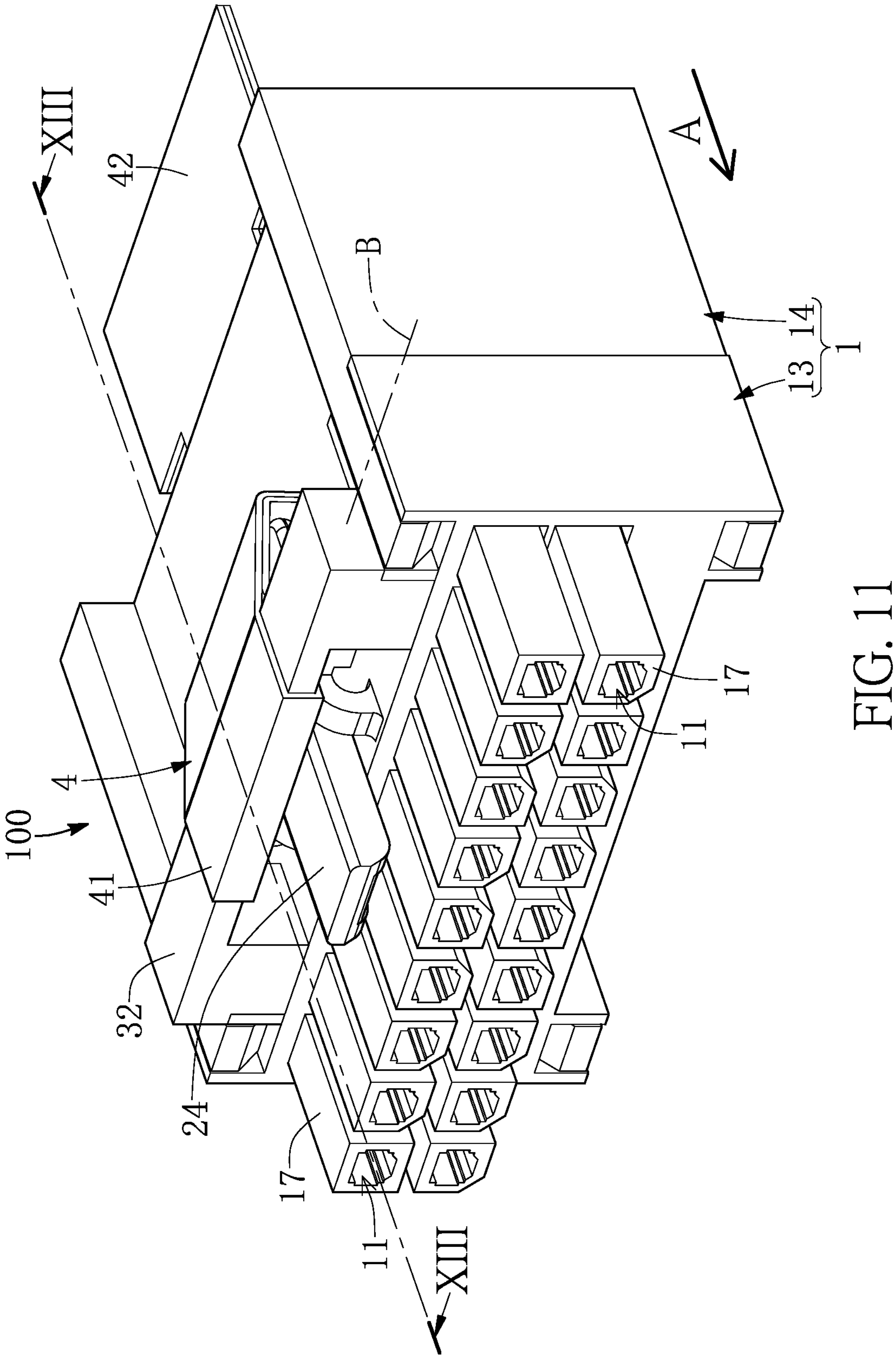
FIG. 11 is a schematic view of a connector according to a third embodiment of the present disclosure.
Figure 12:
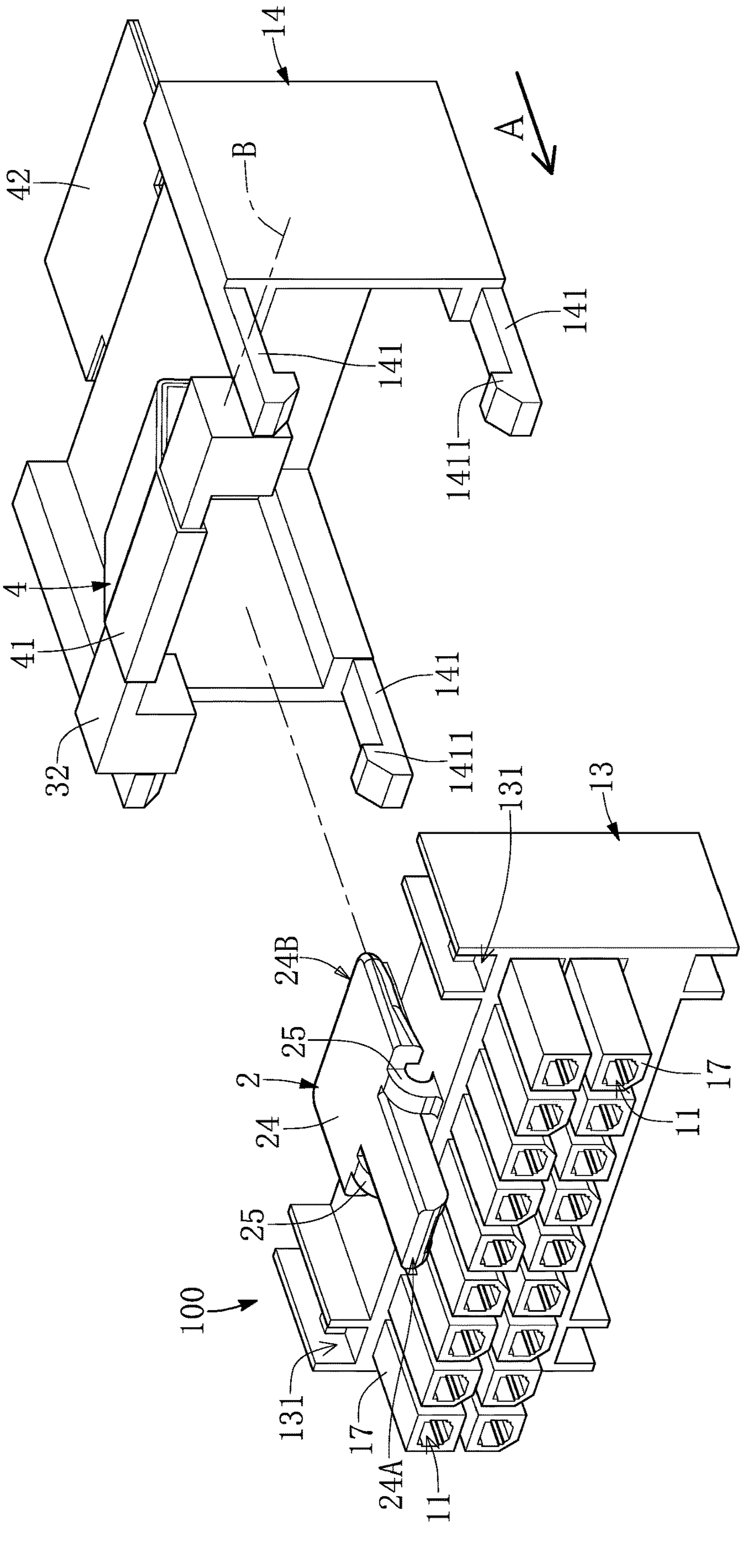
FIG. 12 is a schematic exploded view of the connector according to the third embodiment of the present disclosure.
Figure 13:
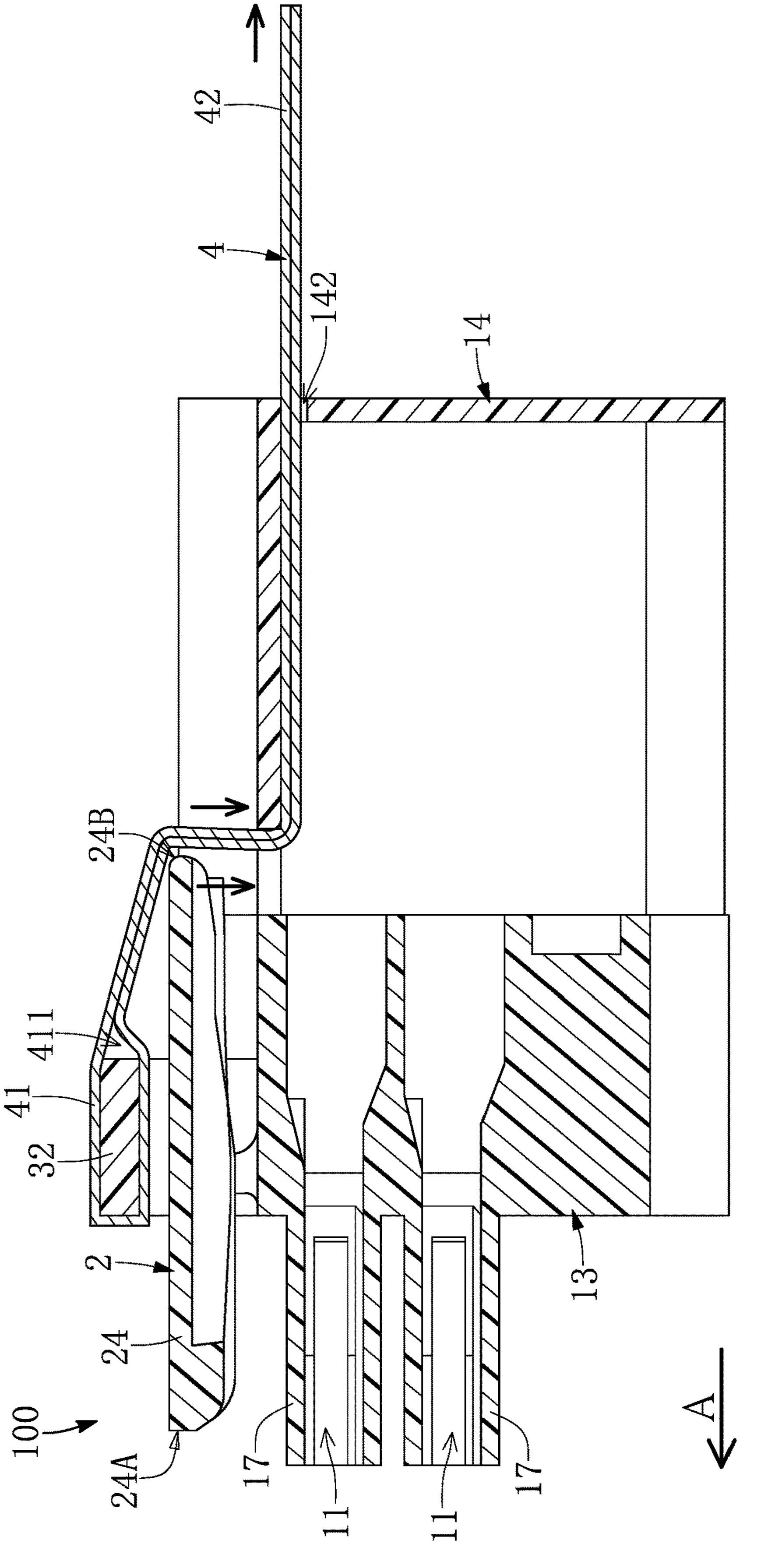
FIG. 13 is a schematic cross-sectional view taken along line XIII-XIII of FIG. 11.

Referring to FIG. 11 to FIG. 13, FIG. 11 and FIG. 12 are respectively a schematic view and a schematic exploded view of a connector according to a third embodiment of the present disclosure, and FIG. 13 is a schematic cross-sectional view taken along line XIII-XIII of FIG. 11.

One of differences between the present embodiment and the aforementioned embodiments is that the docking interface of the body 13 of the insulating base 1 has a plurality of tubular structures 17. Moreover, each of the tubular structures 17 has at least one insertion slot 11, and at least one conductive component is arranged in the insertion slot 11. The lock structure 2 arranged on the body 13 includes an elastic arm 24 and two supporting structures 25, the elastic arm 24 is connected to the body 13 through the two supporting structures 25. A locking end 24A and an unlocking end 24B of the elastic arm 24 can be elastically deformed in a direction toward to the body 13.

Another one of differences between the present embodiment and the aforementioned embodiments is that the cover 14 doesn't include the unlocking elastic arm 3 (as shown in FIG. 1 and FIG. 8), one end of the drawstring 4 has the noose 41, and the noose 41 is directly fixed to the fixing structure 32 that is arranged at an outer side of the insulating base 1. In the present embodiment, the fixing structure 32 is arranged at an outer side of the cover 14, and an appearance of the fixing structure 32 is an inverted U-shaped. The fixing structure 32 is wrapped around the noose 41 along a penetrating axis B, and the penetrating axis B is perpendicular to the docking direction A of the connector 100 (the penetrating axis B doesn't have a vector component of the docking direction A or a vector component of the penetrating axis B relative to the docking direction A is zero). When the cover 14 and the body 13 are fixed to each other, the fixing structure 32 crosses over the lock structure 2, and a part of the drawstring 4 is correspondingly arranged above the unlocking end 24B of the elastic arm 24. Another end of the drawstring 4 is exposed from the insulating base 1 by passing through the through hole 142 of the cover 14. Furthermore, in the present embodiment, the penetrating axis B is a central axis of the through hole 411.

As show in FIG. 13, when the drawstring 4 is pulled in a direction away from the insulating base 1, a segment of the drawstring 4 arranged adjacent to the fixing structure 32 can be moved downward to press the unlocking end 24B of the elastic arm 24. Accordingly, the locking end 24A of the elastic arm 24 is moved in a direction away from the body 13, and then the lock structure 2 can be separated from the docking locking structure of the docking connector 200, and the connector 100 can be pulled away from the docking connector 200 by the drawstring 4.

Fourth Embodiment

Figure 14:
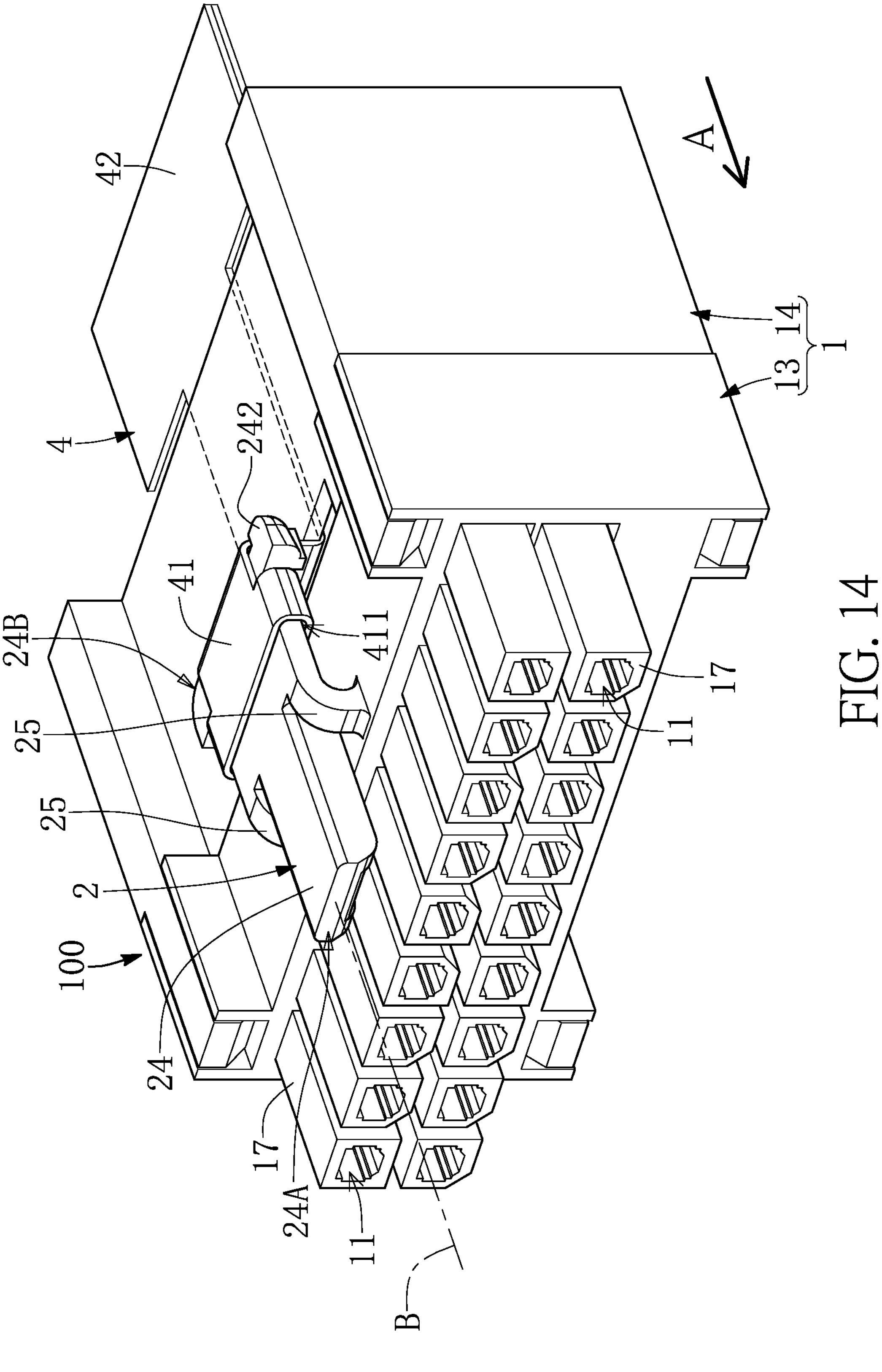
FIG. 14 is a schematic view of a connector according to a fourth embodiment of the present disclosure.

As shown in FIG. 14, FIG. 14 is a schematic view of a connector according to a fourth embodiment of the present disclosure. A difference between the present embodiment and the aforementioned third embodiment is that the cover 14 doesn't include the fixing structure 32, and one end of the drawstring 4 is directly fixed to the unlocking end 24B of the elastic arm 24 of the lock structure 2. The one end of the drawstring 4 has the noose 41 sleeved at the unlocking end 24B of the elastic arm 24, the unlocking end 24B of the elastic arm 24 has a transverse protrusion 242 for fixing the noose 41 on unlocking end 24B. The noose 41 is sleeved at the unlocking end 24B along the penetrating axis B (e.g., the central axis of the through hole 411 of the noose 41) that is an axis the unlocking end 24B passed through the noose 41. The penetrating axis B is parallel to the docking direction A of the connector 100, or the penetrating axis B is not perpendicular to the docking direction A (e.g., the penetrating axis B has at least one vector component of the docking direction A). When the drawstring 4 is pulled in a direction away from the insulating base 1, another end of the drawstring 4 can directly drive the unlocking end 24B of the elastic arm 24 to be elastically deformed in a direction toward to the cover 14, so that the lock structure 2 can be separated from the docking locking structure of the docking connector 200, and the connector 100 can be pulled away from the docking connector 200 by the drawstring 4.

Fifth Embodiment

Figure 15:
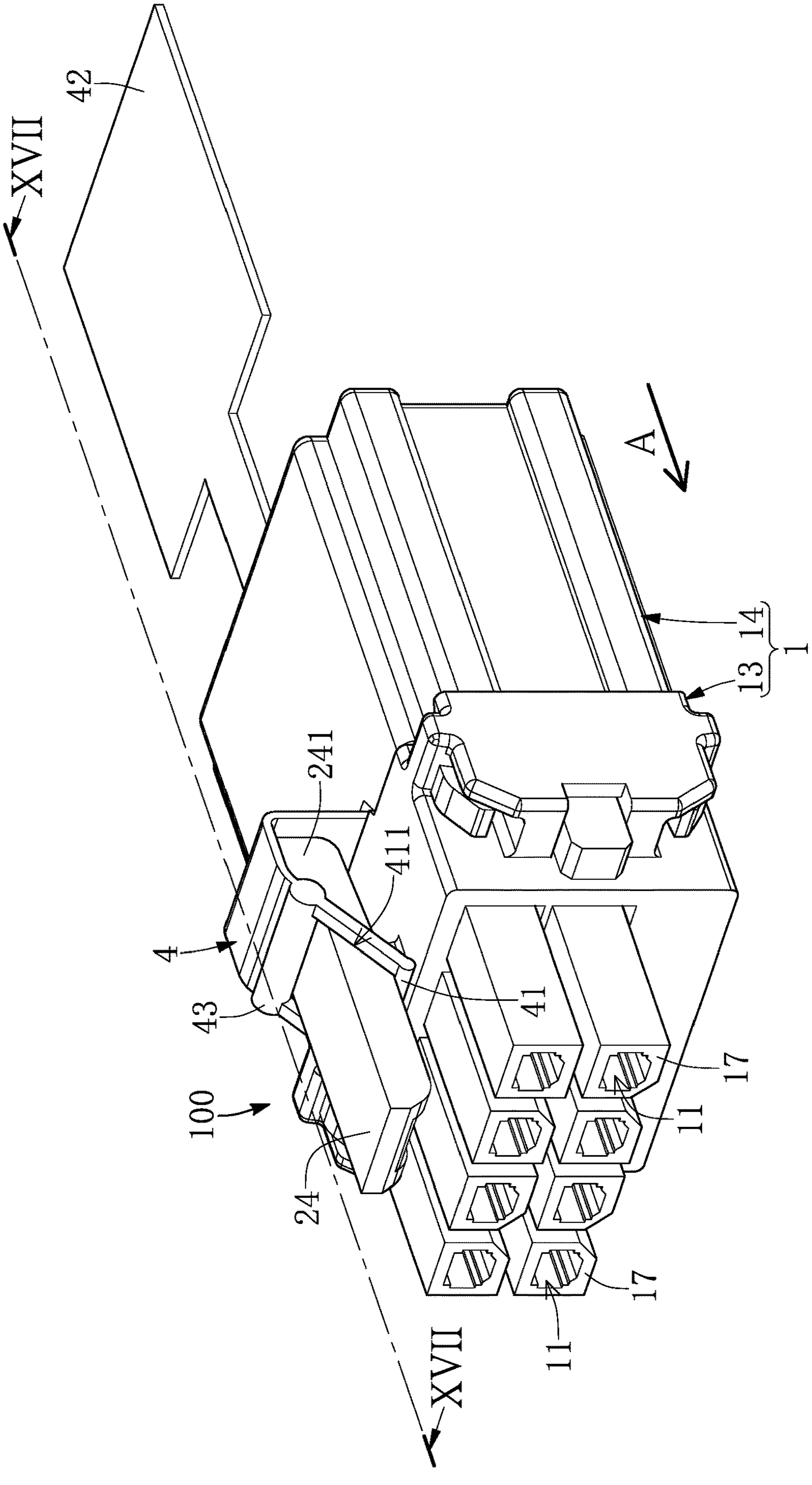
FIG. 15 is a schematic view of a connector according to a fifth embodiment of the present disclosure.
Figure 16:
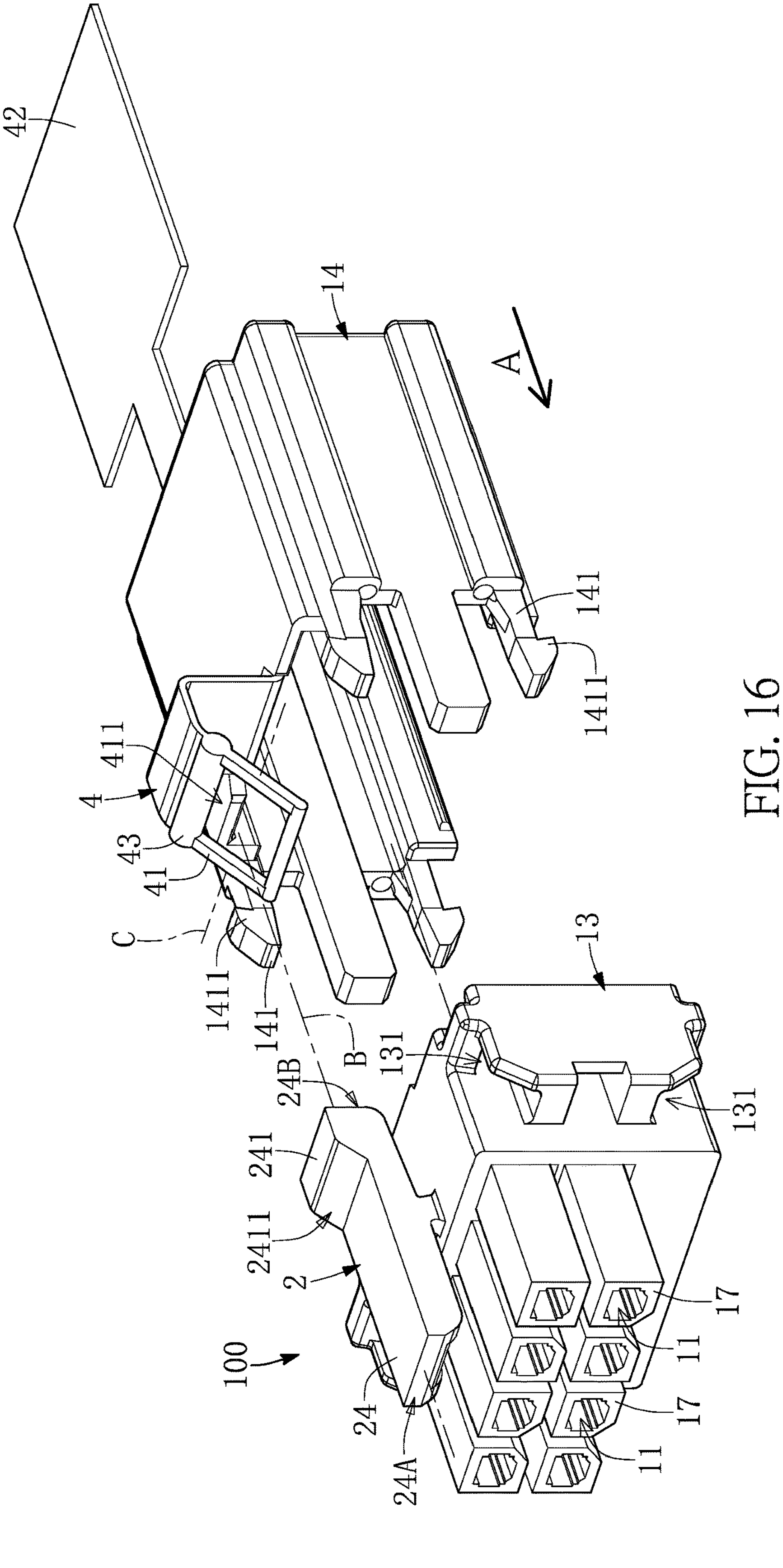
FIG. 16 is a schematic exploded view of the connector according to the fifth embodiment of the present disclosure.
Figure 17:
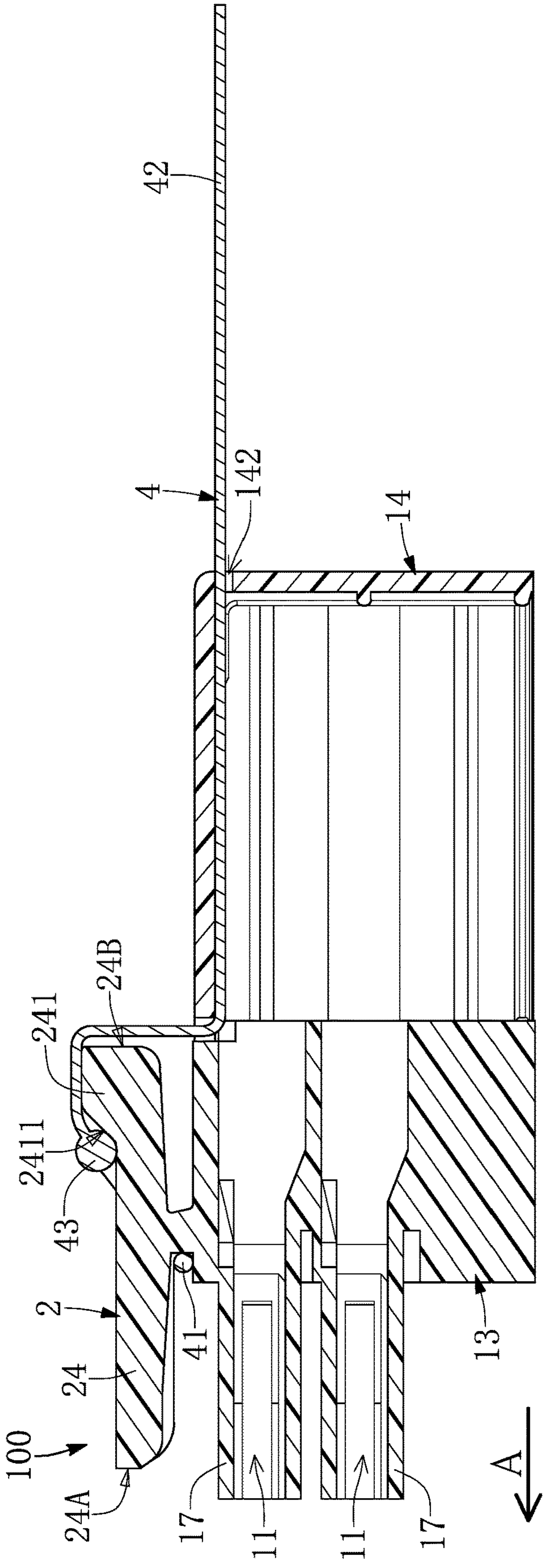
FIG. 17 is a schematic cross-sectional view taken along line XVII-XVII of FIG. 15.

Referring to FIG. 15 to FIG. 17, FIG. 15 and FIG. 16 are respectively a schematic view and a schematic exploded view of the connector according to a fifth embodiment of the present disclosure, and FIG. 17 is a schematic cross-sectional view taken along line XVII-XVII of FIG. 15.

A difference between the present embodiment and the aforementioned fourth embodiment is that the noose 41 of the drawstring 4 is sleeved at the elastic arm 24 through the locking end 24A of the elastic arm 24, a part of the drawstring 4 is correspondingly arranged above the unlocking end 24B of the elastic arm 24, and the another end of the drawstring 4 is passed through the through hole 142 of the cover 14. The noose 41 is sleeved at the locking end 24A along the penetrating axis B that is an axis the locking end 24A passed through the noose 41, and the penetrating axis B is not perpendicular to the docking direction A (e.g., the penetrating axis B has a vector component of the docking direction A). In the present embodiment, the penetrating axis B and the central axis of the through hole 411 have an included angle therebetween, but the penetrating axis B also has the vector component of the docking direction A. Furthermore, the unlocking end 24B of the elastic arm 24 has a protrusion structure 241, the drawstring 4 has an auxiliary abutting structure 43, and the auxiliary abutting structure 43 abuts against the inclined plane 2411 of the protrusion structure 241. The protrusion structure 241 and the elastic arm 24 are approximately shown as an L-shaped.

As shown in FIG. 17, when the drawstring 4 is pulled in a direction away from the insulating base 1, the drawstring 4 arranged above the elastic arm 24 can drive the unlocking end 24B of the elastic arm 24 to move downward, so that the auxiliary abutting structure 43 can abut against the inclined plane 2411, thereby assisting the unlocking end 24B of the elastic arm 24 to move downward. Accordingly, the elastic arm 24 can be separated from the docking locking structure of the docking connector 200.

Sixth Embodiment

Figure 18:
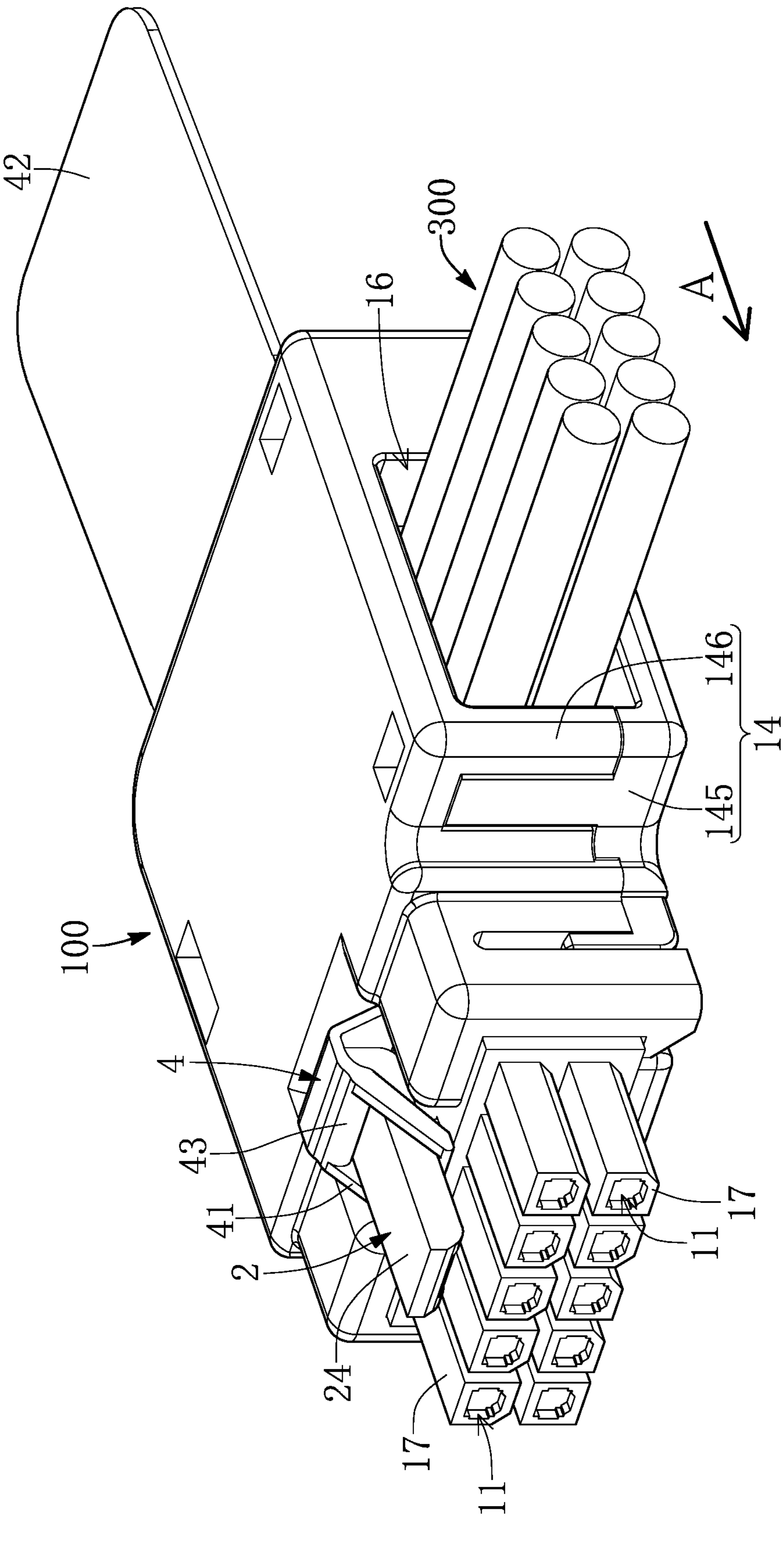
FIG. 18 is a schematic view of a connector according to a sixth embodiment of the present disclosure.
Figure 19:
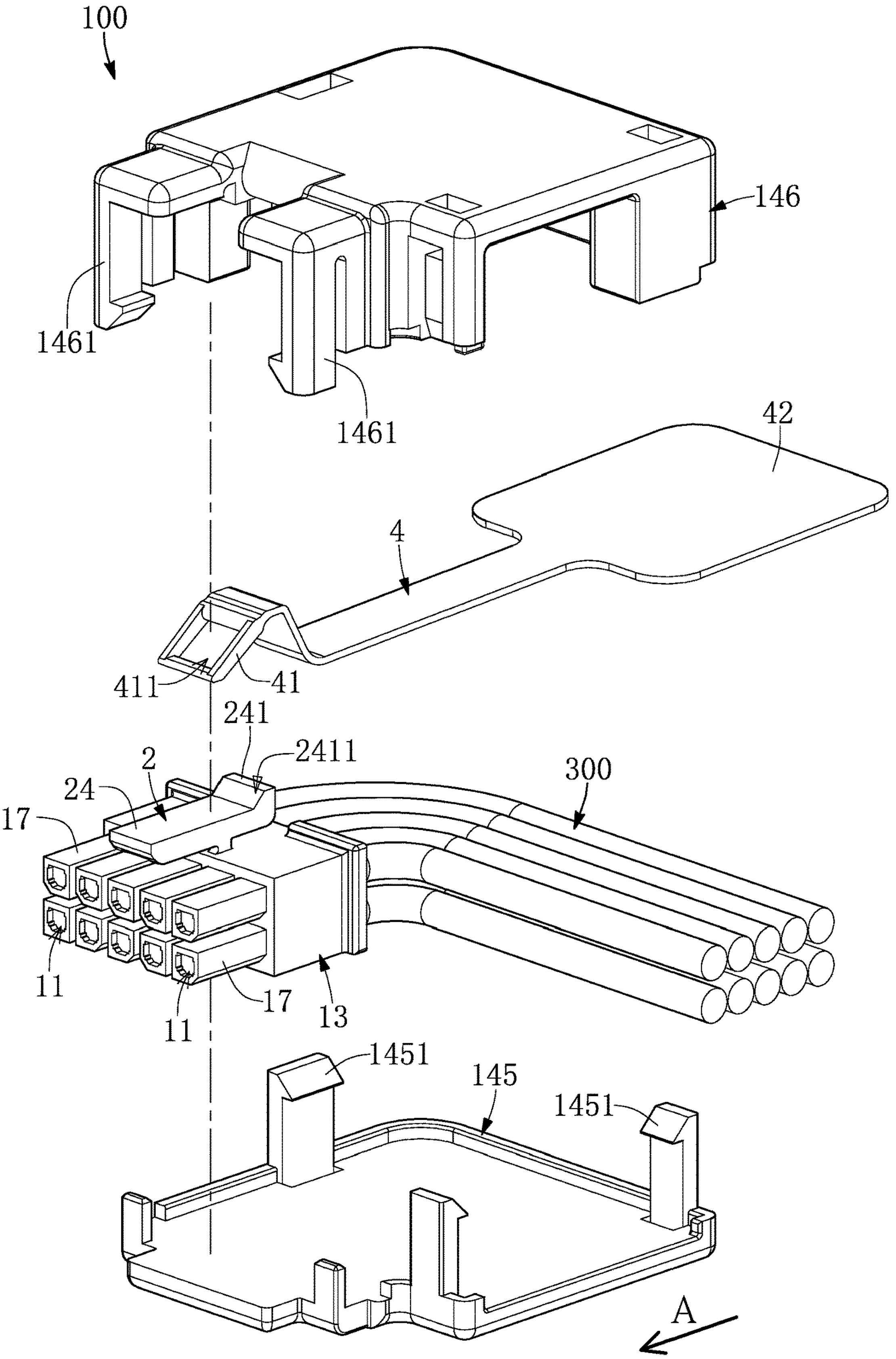
FIG. 19 is a schematic exploded view of the connector according to the sixth embodiment of the present disclosure.

Referring to FIG. 18 to FIG. 19, FIG. 18 and FIG. 19 are respectively a schematic view and a schematic exploded view of the connector according to a sixth embodiment of the present disclosure. A difference between the present embodiment and the aforementioned fifth embodiment is that the body 13 doesn't include the first engaging structure 131, and the cover 14 includes a first cover body 145 and a second cover body 146. The first cover body 145 and the second cover body 146 respectively include a plurality of first cover engaging structures 1451 and a plurality of second cover engaging structures 1461, and the first cover body 145 and the second cover body 146 can be engaged with each other through the first cover engaging structures 1451 and the second cover engaging structures 1461, thereby jointly holding the body 13. It should be noted that a position of the outlet opening 16 of the cover 14 can be arranged at a left side, a right side, an upper side, a lower side, or a back side of the cover 14, but the position of the outlet opening 16 is not limited thereto.

Seventh Embodiment

Figure 20:
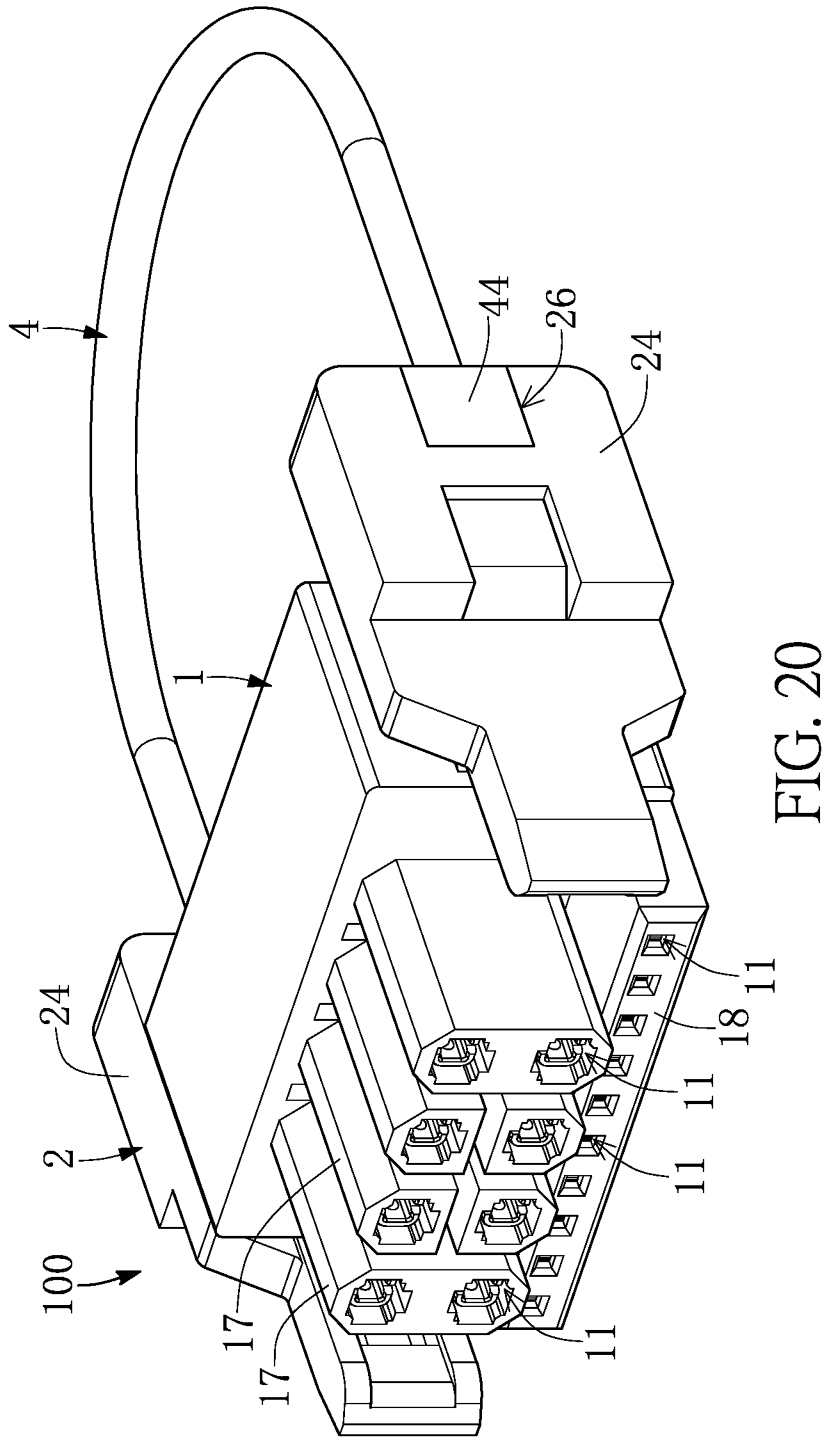
FIG. 20 is a schematic view of a connector according to a seventh embodiment of the present disclosure.
Figure 21:
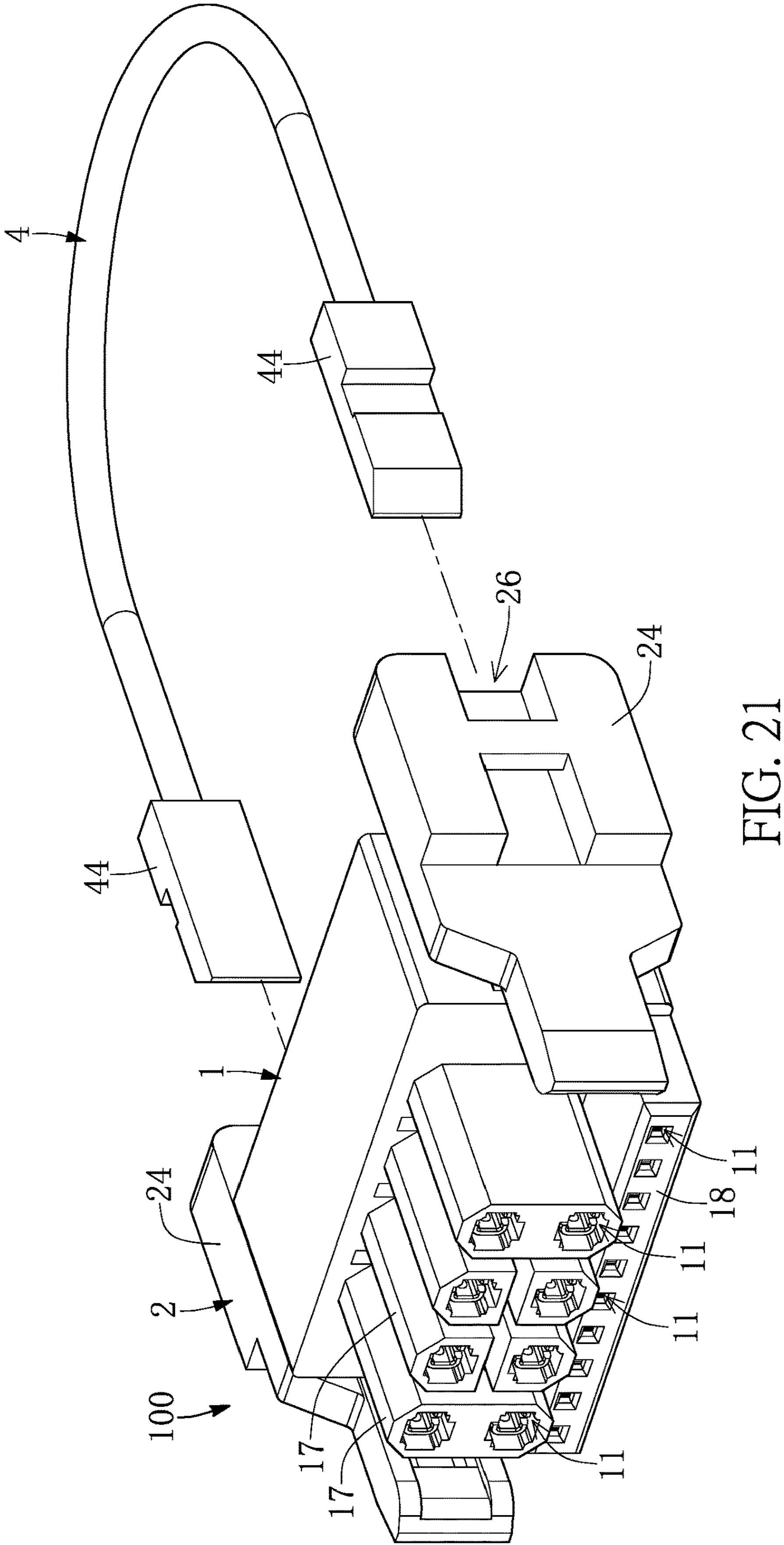
FIG. 21 is a schematic exploded view of the connector according to the seventh embodiment of the present disclosure.
Figure 22:
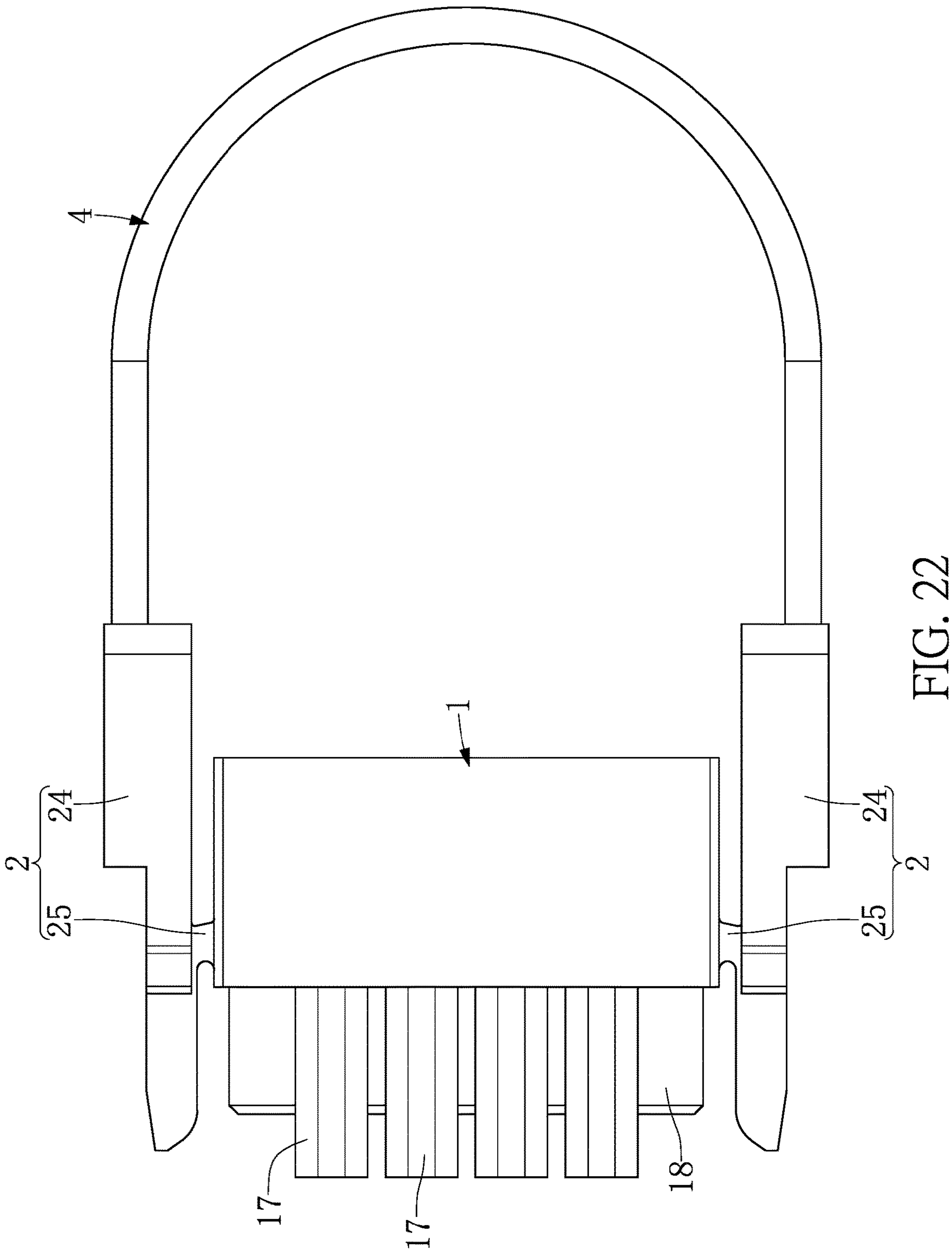
FIG. 22 is a schematic top view of the connector according to the seventh embodiment of the present disclosure.

Referring to FIG. 20 to FIG. 22, FIG. 20 is a schematic view of a connector according to a seventh embodiment of the present disclosure, and FIG. 21 and FIG. 22 are respectively a schematic exploded view and a schematic top view of the connector according to the seventh embodiment of the present disclosure. A difference between the present embodiment and the aforementioned fourth embodiment of FIG. 14 is that the insulating base 1 is not formed by the body 13 and the cover 14, and the insulating base 1 is formed as a single one-piece structure. The insulating base 1 includes a rectangular structure 18, the rectangular structure 18 is arranged adjacent to one side of the tubular structures 17, and the rectangular structure 18 includes a plurality of insertion slots 11. The conductive components in the insertion slots 11 of the tubular structures 17 and the conductive components in the insertion slots 11 of the rectangular structure 18 are respectively configured to transmit power and signals.

Furthermore, in the present embodiment, the connector 100 includes two lock structures 2 that are arranged at two opposite sides of the insulating base 1. Each of the two lock structures 2 includes an elastic arm 24 and at least one supporting structure 25, and the elastic arm 24 is connected to the insulating base 1 through the at least one supporting structure 25. Two ends of the drawstring 4 are connected to one end of the elastic arms 24 of the two lock structures 2.

In practice, each of the two lock structures 2 includes a drawstring fixed slot 26, each of the two ends of the drawstring 4 includes an engaging component 44, and the engaging components 44 of the drawstring 4 are engaged with the drawstring fixed slots 26 of the two lock structures 2.

As shown in FIG. 22, when the drawstring 4 is pulled in a direction away from the insulating base 1, one end of the elastic arms 24 of the two lock structures 2 are elastically deformed by the two ends of the drawstring 4 so as to be moved toward each other, thereby enabling another end of the two lock structures 2 to be separated from the docking locking structure of the docking connector.

Eighth Embodiment

Figure 23:
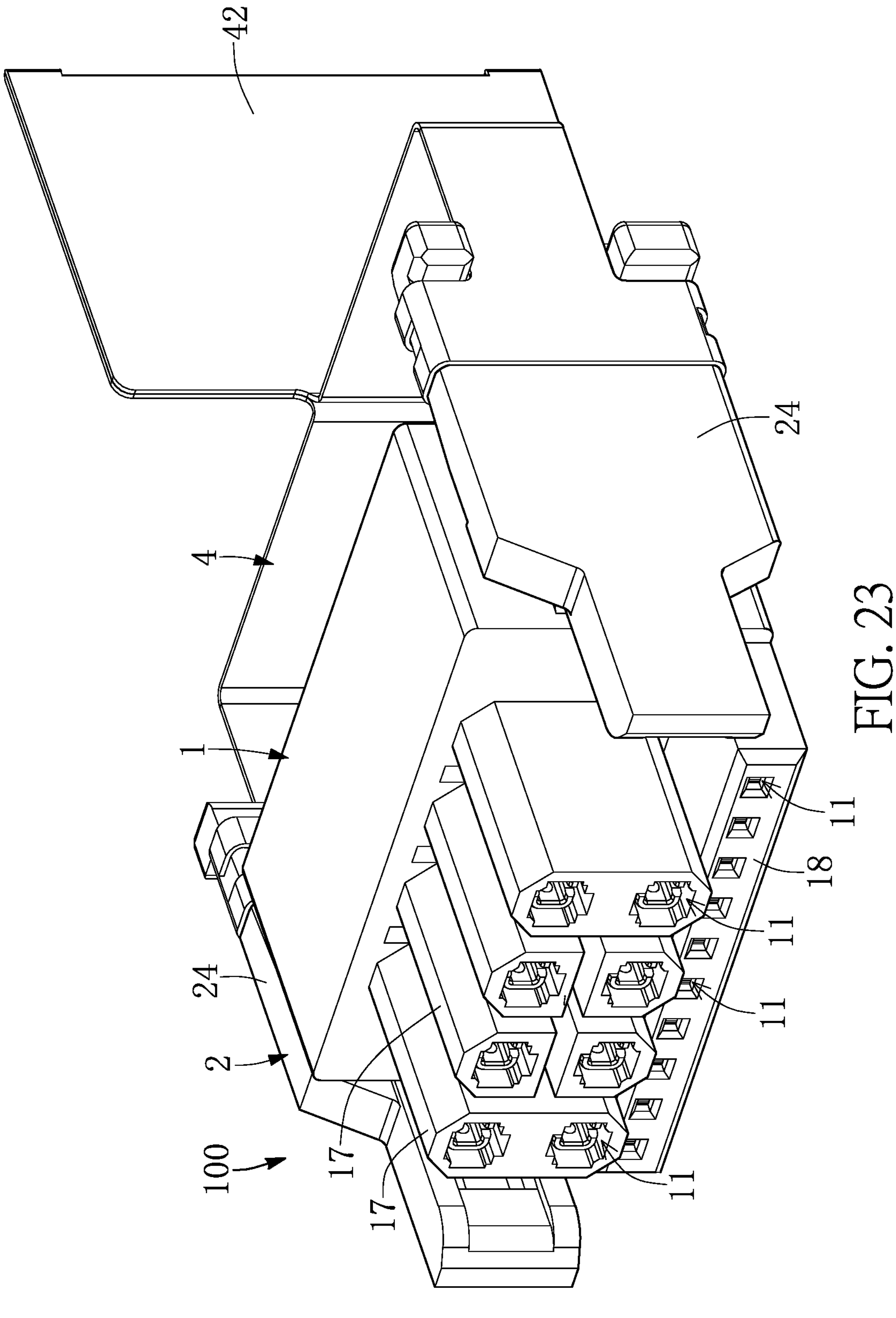
FIG. 23 is a schematic view of a connector according to an eighth embodiment of the present disclosure.

As shown in FIG. 23, FIG. 23 is a schematic view of a connector according to an eighth embodiment of the present disclosure. A difference between the present embodiment and the aforementioned seventh embodiment is that the drawstring 4 has three ends, two of the three ends (e.g., a first end and a second end) are connected to the lock structure 2, and a third end of the three ends includes a hold portion 42. Moreover, the hold portion 42 is a sheet-like structure, and the third end is approximately arranged on a middle of the drawstring 4.

Ninth Embodiment

Figure 24:
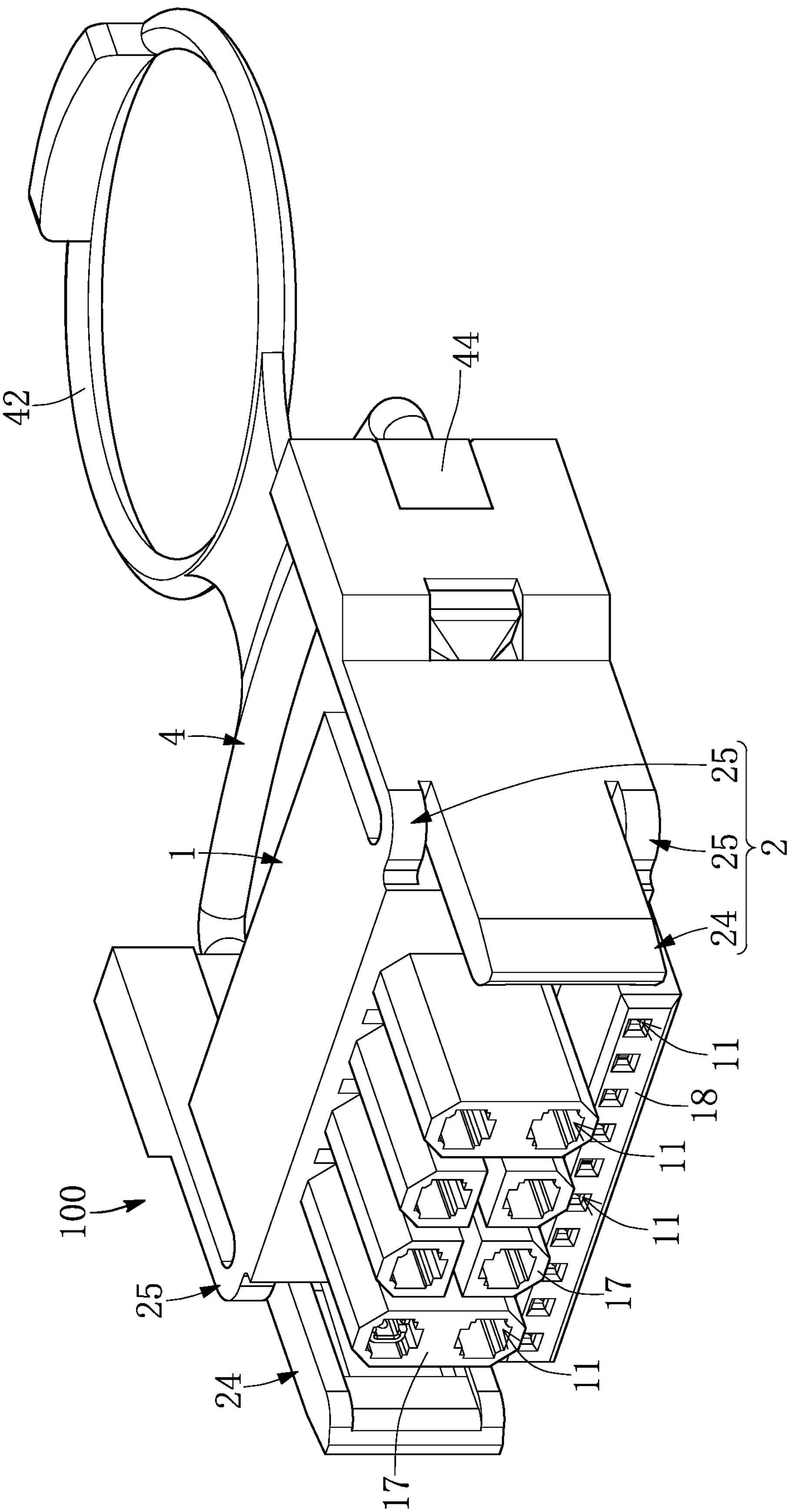
FIG. 24 is a schematic view of a connector according to a ninth embodiment of the present disclosure.

As shown in FIG. 24, FIG. 24 is a schematic view of a connector according to a ninth embodiment of the present disclosure. A difference between the present embodiment and the aforementioned eighth embodiment is that the hold portion 42 of the third end of the drawstring 4 is a ring-shaped structure.

Beneficial Effects of the Embodiments

In conclusion, in the present disclosure, the connector can directly or indirectly drive the lock structure through the drawstring, and the lock structure can be separated from the docking locking structure of the docking connector, thereby allowing the user to easily, conveniently, and quickly separate the connector from the docking connector. The connector of the present disclosure is particularly suitable in a relatively small size connector, or a connector is applied in a small surrounding space that a finger of the user is not easy to reach into.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A connector configured for mating with a docking connector, the connector comprising:

an insulating base, wherein one end of the insulating base has a docking interface, wherein the insulating base includes a body and a cover, one side of the body has the docking interface, and another one side of the body is connected to the cover;

a lock structure disposed on one side of the insulating base, wherein the lock structure is configured to engage with a docking lock structure of the docking connector;

an elastic arm disposed on the insulating base, wherein one end of the elastic arm is arranged at one side of one end of the lock structure, wherein the elastic arm includes a fixing structure; and a drawstring, wherein one end of the drawstring has a noose and is sleeved at the fixing structure through the noose, and another end of the drawstring is exposed from another end of the insulating base;

wherein, when the drawstring is pulled in a direction away from the insulating base, the elastic arm is moved by the drawstring so as to press the end of the lock structure.

2. The connector according to claim 1, wherein an inside of the cover includes a supporting element, the supporting element is arranged adjacent to a free end of the elastic arm, and a part of the drawstring winds around the supporting element.

3. The connector according to claim 1, wherein another one side of the insulating base further includes a through hole that is away from an area of the fixing structure, and the another end of the drawstring is exposed from the insulating base by passing through the through hole.

4. The connector according to claim 1, wherein the body and the cover jointly define an accommodating space, and wherein the docking interface includes a plurality of conductive components, the conductive components are configured to be connected to a plurality of cables, and a part of each of the cables is arranged in the accommodating space.

5. The connector according to claim 4, wherein the lock structure is an elastic sheet-like structure, one end of the elastic sheet-like structure is a free end, another end of the elastic sheet-like structure is connected to the body, and a free end of the elastic arm is arranged at a side of the free end of the elastic sheet-like structure.

6. The connector according to claim 4, wherein the cover has an outlet opening, and the cables pass through the insulating base through the outlet opening.

7. A connector configured for mating with a docking connector along a docking direction, the connector comprising:

an insulating base, wherein one end of the insulating base has a docking interface;

wherein the docking interface includes a plurality of tubular structures, and each of the tubular structures has at least one insertion slot, and wherein the insulating base includes a rectangular structure arranged adjacent to one side of the tubular structures, and the rectangular structure includes a plurality of insertion slots;

a lock structure disposed on one side of the insulating base, wherein the lock structure is switchable between a locked mode and an unlocked mode by a force so as to be engaged with or separated from a docking lock structure of the docking connector;

a drawstring, wherein one end of the drawstring has a noose, the lock structure passes through the noose along a penetrating axis, the lock structure and the noose are connected to each other, another end of the drawstring is exposed from another end of the insulating base, and the penetrating axis is not perpendicular to the docking direction; and a plurality of conductive components, wherein each of the at least one insertion slot of the tubular structures is provided with one of the conductive components arranged therein and configured to transmit power, and wherein each of the plurality of the insertion slots of the rectangular structure is provided with one of the conductive components arranged therein, and configured to transmit signals.

8. The connector according to claim 7, wherein the lock structure includes a locking end and an unlocking end, the locking end is configured to engage with the docking lock structure, the noose is sleeved at the unlocking end, and the unlocking end has a transverse protrusion that is configured to fix the noose.

9. The connector according to claim 7, wherein the lock structure includes a locking end and an unlocking end, the locking end is configured to engage with the docking lock structure, the noose is sleeved at the locking end, and a part of the drawstring is correspondingly arranged above the unlocking end.

10. The connector according to claim 9, wherein the drawstring includes an auxiliary abutting structure, the unlocking end has a protrusion structure, and the auxiliary abutting structure abuts against the protrusion structure.

11. A connector configured for mating with a docking connector along a docking direction, the connector comprising:

an insulating base including a body and a cover, wherein one side of the body has a docking interface; and another one side of the body is connected to the cover;

a lock structure disposed on a side of the insulating base, wherein the lock structure is switchable between a locked mode and an unlocked mode by a force so as to be engaged with or separated from a docking lock structure of the docking connector;

an elastic arm disposed on the insulating base, wherein one side of the elastic arm is arranged at a side of an end of the lock structure; and a drawstring, wherein one end of the drawstring has a noose, the lock structure passes through the noose along a penetrating axis, the lock structure and the noose are connected to each other, another end of the drawstring is exposed from another end of the insulating base by passing through a through hole of the cover, and the penetrating axis is perpendicular to the docking direction;

wherein the lock structure is an elastic sheet-like structure, one end of the elastic sheet-like structure is a free end, another end of the elastic sheet-like structure is connected to the body, and a free end of the elastic arm is arranged at a side of the free end of the elastic sheet-like structure.

12. The connector according to claim 11, wherein the body and the cover jointly define an accommodating space, and wherein the docking interface includes a plurality of conductive components, the conductive components are configured to be connected to a plurality of cables, and a part of each of the cables is arranged in the accommodating space.

13. The connector according to claim 11, wherein an inside of the cover includes a supporting element, the supporting element is arranged adjacent to a free end of the elastic arm, and a part of the drawstring winds around the supporting element.

* * * * *